United States Patent
Kim et al.

(10) Patent No.: US 10,417,735 B2
(45) Date of Patent: Sep. 17, 2019

(54) DATA PROCESSING DEVICE FOR PROCESSING MULTIPLE SENSOR DATA AND SYSTEM INCLUDING THE SAME

(71) Applicant: SAMSUNG ELECTRONICS CO., LTD., Suwon-si (KR)

(72) Inventors: Young Jun Kim, Seongnam-si (KR); Jin Aeon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/843,029

(22) Filed: Dec. 15, 2017

(65) Prior Publication Data
US 2018/0108108 A1    Apr. 19, 2018

Related U.S. Application Data

(63) Continuation of application No. 14/977,975, filed on Dec. 22, 2015, now Pat. No. 9,846,919.

(30) Foreign Application Priority Data

Feb. 16, 2015  (KR) .................. 10-2015-0023047
Jul. 28, 2015  (KR) .................. 10-2015-0106716

(51) Int. Cl.
*G06T 1/20*  (2006.01)
*G06T 1/00*  (2006.01)
(Continued)

(52) U.S. Cl.
CPC .............. *G06T 1/20* (2013.01); *G06T 1/0007* (2013.01); *G06T 5/005* (2013.01); *G06T 5/008* (2013.01);
(Continued)

(58) Field of Classification Search
CPC ..... G06K 9/00744; G06T 1/0007; G06T 1/20; G06T 5/005; G06T 5/008; G06T 5/50;
(Continued)

(56) References Cited

U.S. PATENT DOCUMENTS 5,784,339 A    7/1998  Woodsum
6,233,279 B1 *  5/2001  Boon .................... G06T 9/20
                                        375/240.08
(Continued)

FOREIGN PATENT DOCUMENTS

JP    2010-147786 A    7/2010
JP    2013153283 A    8/2013
(Continued)

*Primary Examiner* — Jingge Wu
(74) *Attorney, Agent, or Firm* — Sughrue Mion, PLLC

(57) ABSTRACT

Provided is a data processing device and a method of operating the same. The data processing device includes: a plurality of preprocessors configured to perform correction processing on a plurality of sensor data; a first switching circuit configured to selectively map and input the plurality of sensor data from at least two sensors to at least two preprocessors among the plurality of preprocessors; and a hybrid data processing engine configured to perform at least one of image enhancement and depth information determination on the plurality of sensor data received, via an on-the-fly method, from the at least two preprocessors.

15 Claims, 18 Drawing Sheets

(51) Int. Cl.
*G06T 5/00* (2006.01)
*G06T 5/50* (2006.01)

(52) U.S. Cl.
CPC ...... *G06T 5/50* (2013.01); *G06T 2207/10024* (2013.01)

(58) Field of Classification Search
CPC .. H04N 19/59; H04N 19/85; H04N 21/44008; H04N 1/405
See application file for complete search history.

(56) References Cited

U.S. PATENT DOCUMENTS

| | | | |
|---|---|---|---|
| 7,010,863 | B1 | 3/2006 | Juvinall |
| 8,514,491 | B2 | 8/2013 | Duparre |
| 8,542,288 | B2 | 9/2013 | Waqas et al. |
| 8,792,025 | B2 | 7/2014 | Kanemitsu et al. |
| 8,941,706 | B2 | 1/2015 | Guo et al. |
| 9,225,889 | B1 | 12/2015 | Korkin |
| 2004/0125226 | A1 | 7/2004 | Kubo |
| 2004/0240563 | A1* | 12/2004 | Chiu .............. H04N 9/315 375/240.29 |
| 2004/0252862 | A1 | 12/2004 | Camus |
| 2005/0013465 | A1 | 1/2005 | Southall |
| 2005/0030267 | A1* | 2/2005 | Tanghe ............ G09G 3/3216 345/82 |
| 2005/0140786 | A1 | 6/2005 | Kaplinsky |
| 2006/0044268 | A1 | 3/2006 | Robin |
| 2006/0062427 | A1* | 3/2006 | Burkhart .......... G06K 9/00449 382/100 |
| 2008/0204763 | A1* | 8/2008 | Turbell ............ G01B 11/25 356/601 |
| 2008/0247672 | A1 | 10/2008 | Kaplinsky |
| 2008/0278608 | A1 | 11/2008 | Kim et al. |
| 2009/0180555 | A1* | 7/2009 | Sun .............. H04N 7/26058 375/240.29 |
| 2010/0004784 | A1* | 1/2010 | Chang ............ G06T 7/593 700/259 |
| 2010/0092038 | A1 | 4/2010 | Theodore |
| 2010/0238350 | A1* | 9/2010 | Radhakrishnan .......... G06F 17/30799 348/571 |
| 2011/0004341 | A1* | 1/2011 | Sarvadevabhatla .... B25J 9/1602 700/250 |
| 2011/0249086 | A1 | 10/2011 | Guo et al. |
| 2011/0262045 | A1 | 10/2011 | Ichikawa |
| 2013/0050426 | A1 | 2/2013 | Sarmast et al. |
| 2014/0002616 | A1 | 1/2014 | Ohba et al. |
| 2014/0085422 | A1 | 3/2014 | Aronsson et al. |
| 2014/0098194 | A1 | 4/2014 | Goma et al. |
| 2014/0142872 | A1* | 5/2014 | Hedin ............ G01H 1/003 702/56 |
| 2014/0211286 | A1* | 7/2014 | Nam ............ G03H 1/0808 359/9 |
| 2014/0313369 | A1 | 10/2014 | Kageyama |
| 2014/0362179 | A1* | 12/2014 | Lee ............ H04N 13/00 348/43 |
| 2015/0002907 | A1* | 1/2015 | Ukishima ........ G06K 15/1868 358/3.24 |
| 2015/0182118 | A1 | 7/2015 | Bradbury |
| 2015/0319827 | A1* | 11/2015 | Lee ............ H05B 37/0227 315/152 |
| 2015/0341620 | A1* | 11/2015 | Han ............ B60R 1/00 701/37 |
| 2016/0012218 | A1* | 1/2016 | Perna ............ G06K 9/0061 726/18 |
| 2016/0309056 | A1* | 10/2016 | Wakui ............ B41J 2/2139 |

FOREIGN PATENT DOCUMENTS

| | | |
|---|---|---|
| KR | 10-2012-0047482 A | 5/2012 |
| KR | 101217476 B1 | 1/2013 |
| WO | 2014083489 A1 | 6/2014 |

* cited by examiner

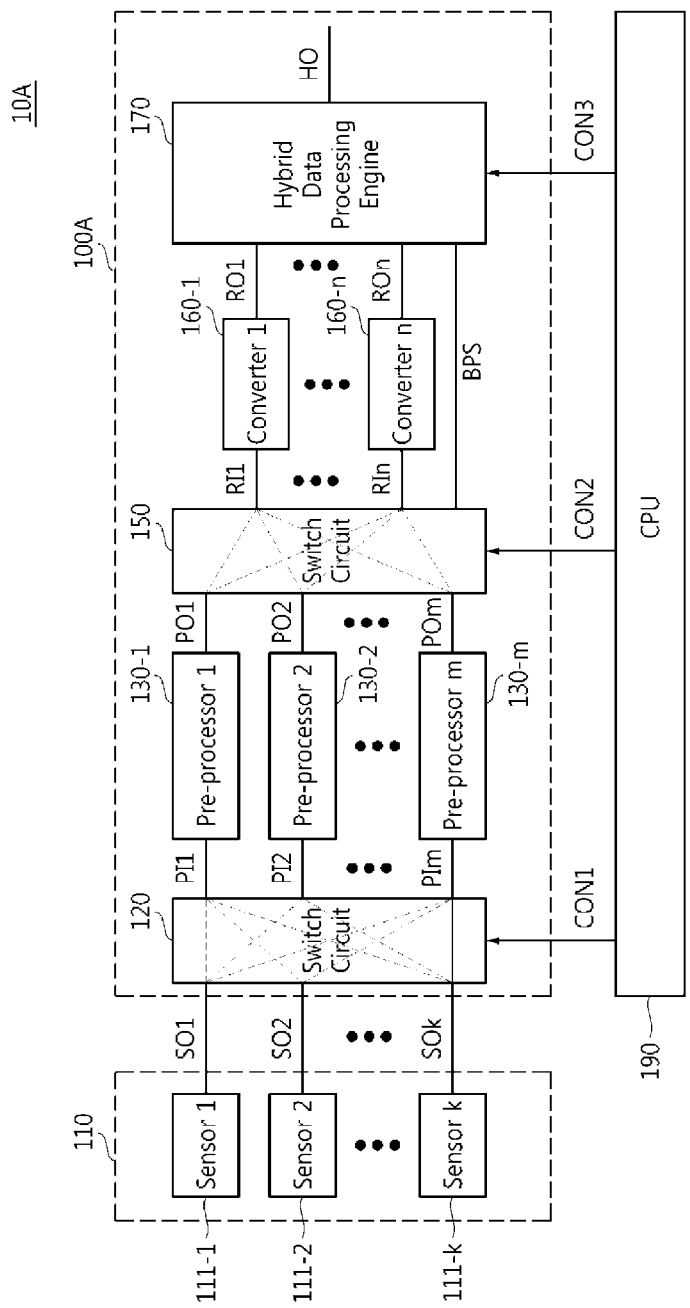

(a)  (b)

(a)  (b)

DATA PROCESSING DEVICE FOR PROCESSING MULTIPLE SENSOR DATA AND SYSTEM INCLUDING THE SAME

CROSS-REFERENCE TO RELATED APPLICATION

This application is a continuation application of U.S. patent application Ser. No. 14/977,975, filed on Dec. 22, 2015, which claims priority from Korean Patent Application Nos. 10-2015-0023047, filed on Feb. 16, 2015 and 10-2015-0106716, filed on Jul. 28, 2015 in the Korean Intellectual Property Office, the disclosure of which is incorporated herein in its entirety by reference.

BACKGROUND

Apparatuses and methods consistent with one or more exemplary embodiments relate to a data processing device for processing at least two sets of sensor data and a system including the same.

With advancements in digital camera technology, existing analog camera functions have been digitized, and the scope of digital camera technology has been expanded to a variety of new fields.

In particular, various sensors have been introduced to overcome the limitations of charge-coupled device (CCD) sensors or CMOS image sensors (CISs). Thus, smart phones or portable camera devices employing two or more sensors have been developed.

SUMMARY

Aspects of one or more exemplary embodiments provide a data processing device capable of efficiently processing homogeneous or heterogeneous multiple sensor data, and a system including the same.

Aspects of one or more exemplary embodiments also provide a general-purpose data processing device capable of processing data according to various types and numbers of sensors, and decreasing memory access so as to decrease a memory bandwidth and power consumption, and a system including the same.

According to an aspect of an exemplary embodiment, there is provided a data processing device including: a plurality of preprocessors configured to perform correction processing on a plurality of sensor data; a first switching circuit configured to selectively map and input the plurality of sensor data from at least two sensors to at least two preprocessors among the plurality of preprocessors; and a hybrid data processing engine configured to perform at least one of image enhancement and depth information determination on the plurality of sensor data received, via an on-the-fly method, from the at least two preprocessors.

The first switching circuit may be configured to selectively map and input the plurality of sensor data from at least two different types of sensors.

The first switching circuit may be configured to selectively map and input the plurality of sensor data from the at least two sensors to the at least two preprocessors according to types of the plurality of sensor data.

When first sensor data from a first sensor and second sensor data from a second sensor are input to the first switching circuit, the first switching circuit may be configured to map and input the first sensor data and the second sensor data to a first preprocessor and a second preprocessor, respectively, from among the plurality of preprocessors.

When the second sensor data from the second sensor and third sensor data from a third sensor are input to the first switching circuit, the first switching circuit may be configured to map and input the second sensor data and the third sensor data to the first preprocessor and the second preprocessor, respectively.

Each of the plurality of preprocessors may include at least one of: a lens shading corrector configured to correct a difference between light and shade caused by lens shading; a bad pixel corrector configured to correct a bad pixel; and a chromatic aberration corrector configured to correct a chromatic aberration.

A first preprocessor, among the plurality of preprocessors, may further include a first rectification engine configured to rectify first sensor data input to the first preprocessor based on second sensor data input to a second preprocessor, among the plurality of preprocessors.

The second preprocessor may not include a rectification engine.

The first rectification engine may be configured to rectify the first sensor data based on the second sensor data by performing at least one of transition, rotation, and scaling on the first sensor data.

The first rectification engine may be configured to rectify the first sensor data based on the second sensor data received by the first rectification engine from the second preprocessor.

The second preprocessor may further include a second rectification engine; and the first rectification engine may be configured to rectify the first sensor data and the second rectification engine is configured to rectify the second sensor data based on a control signal received from a register or a central processing unit.

The hybrid data processing engine may include a plurality of hardware elements configured to perform the at least one of the image enhancement and the depth information determination.

Connections between the plurality of hardware elements and operations of the plurality of hardware elements may be selectively configured according to a mode of operation of the data processing device.

The data processing device may further include a register configured to selectively control the connections between the plurality of hardware elements and the operations of the plurality of hardware elements according to the mode of operation.

The plurality of hardware elements may include a plurality of processing elements or a plurality of logic gates.

The data processing device may further include a plurality of converters configured to selectively convert at least one of resolutions and pixel formats of the plurality of sensor data received from the at least two preprocessors.

The data processing device may further include a second switching circuit configured to selectively map and input the plurality of sensor data from the at least two preprocessors to the plurality of converters, according to a mode of operation of the data processing device.

The second switching circuit may be configured to selectively bypass the plurality of converters and directly input the plurality of sensor data from the at least two preprocessors to the hybrid data processing engine, according to the mode of operation.

According to an aspect of another exemplary embodiment, there is provided a method of processing a plurality of sensor data by a data processing device, the method including: selectively mapping and inputting the plurality of sensor data from at least two sensors to at least two preprocessors among a plurality of preprocessors of the data processing device; performing, by the at least two preprocessors, correction processing on the plurality of sensor data; and performing at least one of image enhancement and depth information determination on the plurality of sensor data received, via an on-the-fly method, from the at least two preprocessors.

The selectively mapping and inputting the plurality of sensor data may include selectively mapping and inputting the plurality of sensor data from at least two different types of sensors.

The selectively mapping and inputting the plurality of sensor data may include selectively mapping and inputting the plurality of sensor data from the at least two sensors to the at least two preprocessors according to types of the plurality of sensor data.

The selectively mapping and inputting the plurality of sensor data according to types of the plurality of sensor data may include, when first sensor data from a first sensor and second sensor data from a second sensor are received, mapping and inputting the first sensor data and the second sensor data to a first preprocessor and a second preprocessor, respectively, from among the plurality of preprocessors.

The selectively mapping and inputting the plurality of sensor data according to types of the plurality of sensor data may further include, when the second sensor data from the second sensor and third sensor data from a third sensor are received, mapping and inputting the second sensor data and the third sensor data to the first preprocessor and the second preprocessor, respectively.

The performing the correction processing may include correcting, by each of the at least two preprocessors, at least one of a bad pixel, a chromatic aberration, and a difference between light and shade caused by lens shading.

The performing the correction processing may further include rectifying, by a first preprocessor among the plurality of preprocessors, first sensor data input to the first preprocessor based on second sensor data input to a second preprocessor among the plurality of preprocessors.

The second preprocessor may not perform rectifying of the second sensor data.

The performing the at least one of the image enhancement and the depth information determination may include performing, by a plurality of hardware elements, the at least one of the image enhancement and the depth information determination.

Connections between the plurality of hardware elements and operations of the plurality of hardware elements may be selectively configured according to a mode of operation of the data processing device.

The plurality of hardware elements may include a plurality of elements or a plurality of logic gates.

According to an aspect of another exemplary embodiment, there is provided a data processing device including: a plurality of preprocessors configured to perform correction processing on a plurality of sensor data; a first switching circuit configured to selectively map and input the plurality of sensor data from at least two sensors to at least two preprocessors among the plurality of preprocessors; and a hybrid data processing engine configured to obtain the plurality of preprocessed sensor data from an external memory, and to perform at least one of image enhancement and depth information determination on the plurality of preprocessed sensor data.

The first switching circuit may be configured to selectively map and input the plurality of sensor data from at least two different types of sensors.

The first switching circuit may be configured to selectively map and input the plurality of sensor data from the at least two sensors to the at least two preprocessors according to types of the plurality of sensor data.

Each of the plurality of preprocessors may include at least one of: a lens shading corrector configured to correct a difference between light and shade caused by lens shading; a bad pixel corrector configured to correct a bad pixel; and a chromatic aberration corrector configured to correct a chromatic aberration.

A first preprocessor, among the plurality of preprocessors, may further include a first rectification engine configured to rectify first sensor data input to the first preprocessor based on second sensor data input to a second preprocessor, among the plurality of preprocessors.

The second preprocessor may not include a rectification engine.

The first rectification engine may be configured to rectify the first sensor data based on the second sensor data by performing at least one of transition, rotation, and scaling on the first sensor data.

The first rectification engine may be configured to rectify the first sensor data based on the second sensor data received by the first rectification engine from the second preprocessor.

The second preprocessor may further include a second rectification engine; and the first rectification engine may be configured to rectify the first sensor data and the second rectification engine may be configured to rectify the second sensor data based on a control signal received from a register or a central processing unit.

The hybrid data processing engine may include a plurality of hardware elements configured to perform the at least one of the image enhancement and the depth information determination.

Connections between the plurality of hardware elements and operations of the plurality of hardware elements may be selectively configured according to a mode of operation of the data processing device.

According to an aspect of another exemplary embodiment, there is provided a method of processing a plurality of sensor data by a data processing device, the method including: selectively mapping and inputting the plurality of sensor data from at least two sensors to at least two preprocessors among a plurality of preprocessors of the data processing device; performing, by the at least two preprocessors, correction processing on the plurality of sensor data; and performing at least one of image enhancement and depth information determination on the plurality of preprocessed sensor data.

The performing the at least one the image enhancement and the depth information determination may include obtaining the plurality of preprocessed sensor data from an external memory and performing the at least one of the image enhancement and the depth information determination on the obtained plurality of preprocessed sensor data.

The performing the at least one the image enhancement and the depth information determination may include performing the at least one of the image enhancement and the depth information determination on the plurality of sensor data received, via an on-the-fly method, from the at least two preprocessors.

According to an aspect of another exemplary embodiment, there is provided a data processing device including: a plurality of preprocessors configured to perform correction processing on a plurality of sensor data; a first switching circuit configured to selectively map and input the plurality of sensor data from at least two sensors to at least two preprocessors among the plurality of preprocessors; and a hybrid data processing engine configured to perform at least one of image enhancement and depth information determination on the plurality of sensor data received from the at least two preprocessors.

The hybrid data processing engine may be configured to receive the plurality of sensor data from the at least two preprocessors via a memory access.

The hybrid data processing engine may be configured to receive the plurality of sensor data from the at least two preprocessors without use of a memory.

According to an aspect of another exemplary embodiment, there is provided a data processing system including: a plurality of sensors configured to obtain a plurality of sensor data; and a data processing device including: a plurality of preprocessors configured to perform correction processing on the plurality of sensor data; a first switching circuit configured to selectively map and input the plurality of sensor data from at least two sensors, among the plurality of sensors, to at least two preprocessors, among the plurality of preprocessors; and a hybrid data processing engine configured to perform at least one of image enhancement and depth information determination on the plurality of sensor data received from the at least two preprocessors.

The at least two sensors may be different types of sensors.

The data processing system may further include a central processing unit configured to control the selective mapping and inputting of the first switching circuit.

BRIEF DESCRIPTION OF THE DRAWINGS

Exemplary embodiments will be more clearly understood from the following detailed description taken in conjunction with the accompanying drawings in which:

FIG. 1A is a block diagram of a data processing system according to an exemplary embodiment;

DETAILED DESCRIPTION OF EXEMPLARY EMBODIMENTS

Figure 1B:
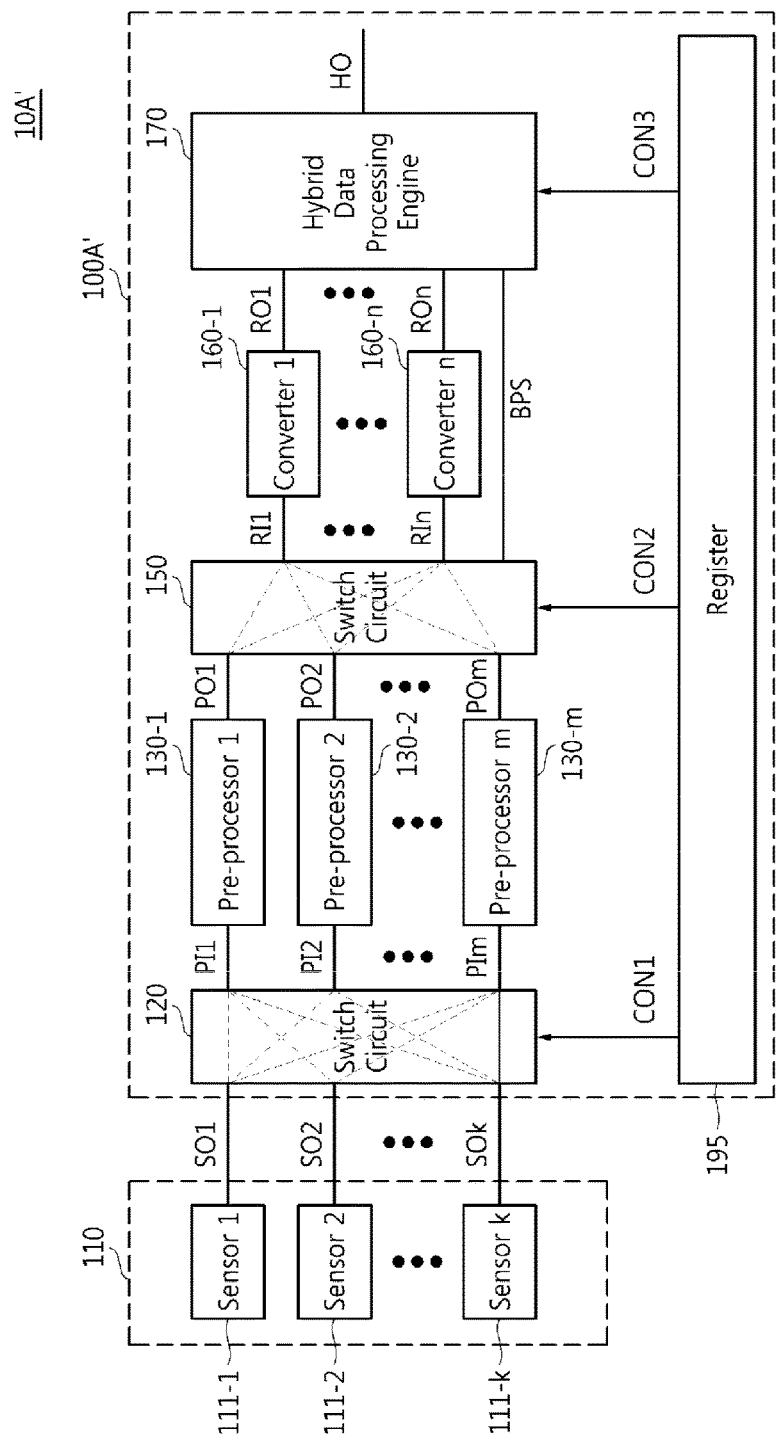
FIG. 1B is a modified example of a data processing system according to an exemplary embodiment.

Exemplary embodiments will now be described more fully hereinafter with reference to the accompanying drawings, in which exemplary embodiments are shown. Exemplary embodiments may, however, be embodied in many different forms and should not be construed as limited to exemplary embodiments set forth herein. Rather, these exemplary embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/". Furthermore, expressions such as "at least one of," when preceding a list of elements, modify the entire list of elements and do not modify the individual elements of the list.

It will be understood that, although the terms first, second, etc., may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular exemplary embodiments only and is not intended to be limiting of the inventive concept. As used herein, the singular forms "a", "an", and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 2:
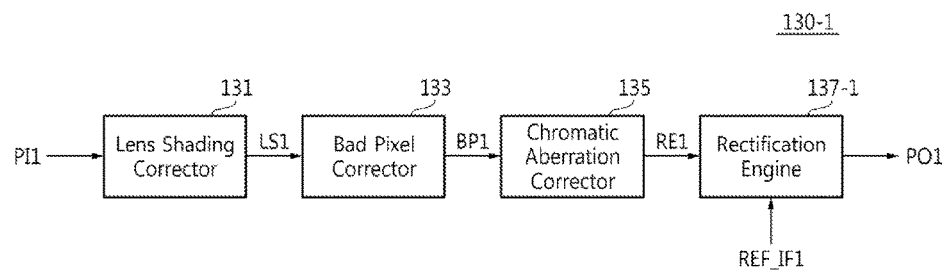
FIG. 2 is a block diagram of a first preprocessor of FIG. 1A according to an exemplary embodiment.
Figure 3A:
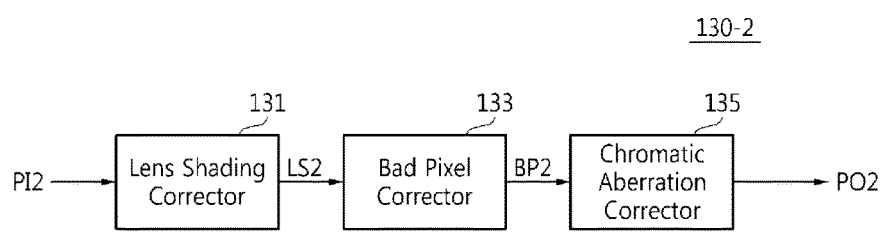
FIG. 3A is a block diagram of a second preprocessor of FIG. 1A according to an exemplary embodiment.
Figure 3B:
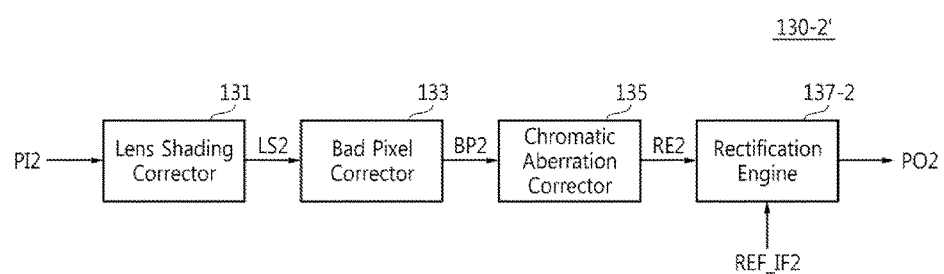
FIG. 3B is a block diagram of a second preprocessor of FIG. 1A according to another exemplary embodiment.
Figure 4:
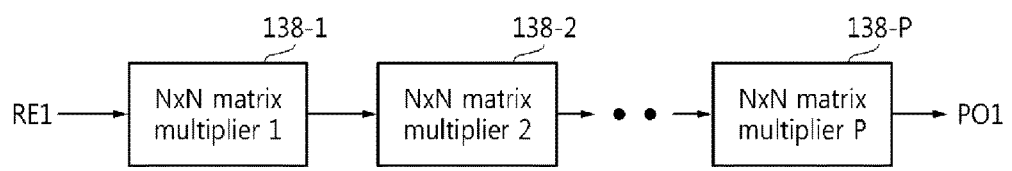
FIG. 4 is a block diagram of a rectification engine of FIG. 2 according to an exemplary embodiment.
Figure 5:
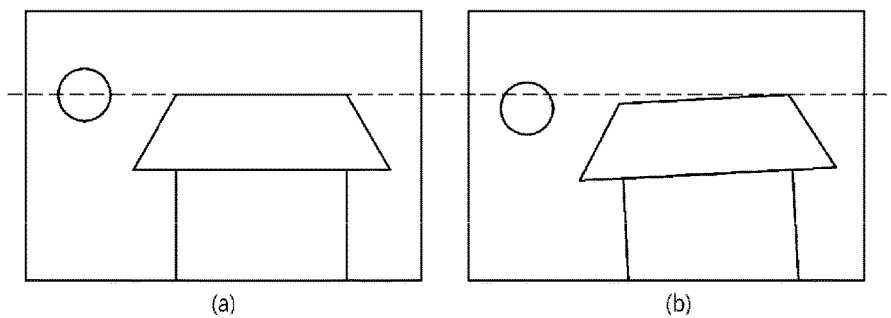
FIGS. 5 and 6 are diagrams for explaining an operation of the rectification engine of FIG. 4, according to one or more exemplary embodiments.
Figure 6:
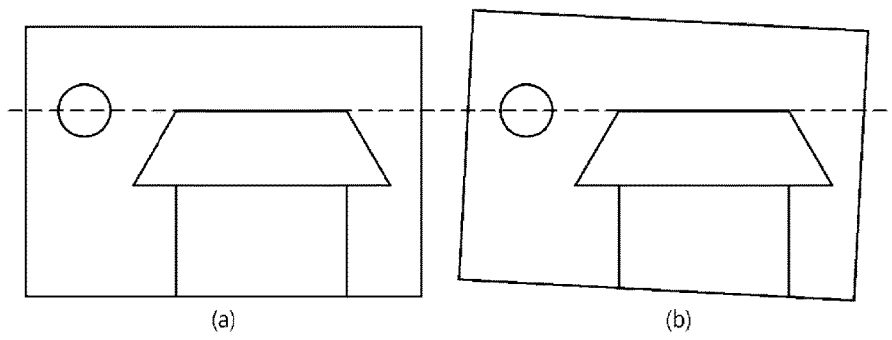
Figure 7:
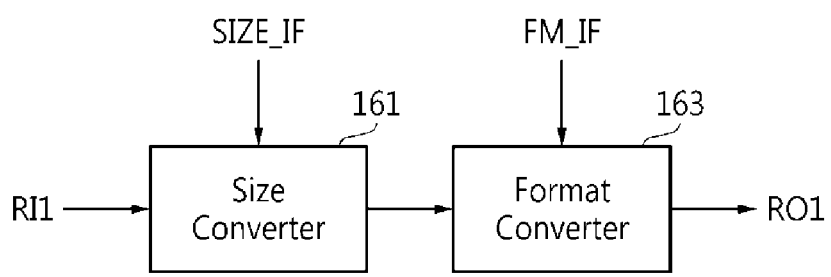
FIG. 7 is a block diagram of a converter illustrated in FIG. 1A according to an exemplary embodiment.
Figure 8A:
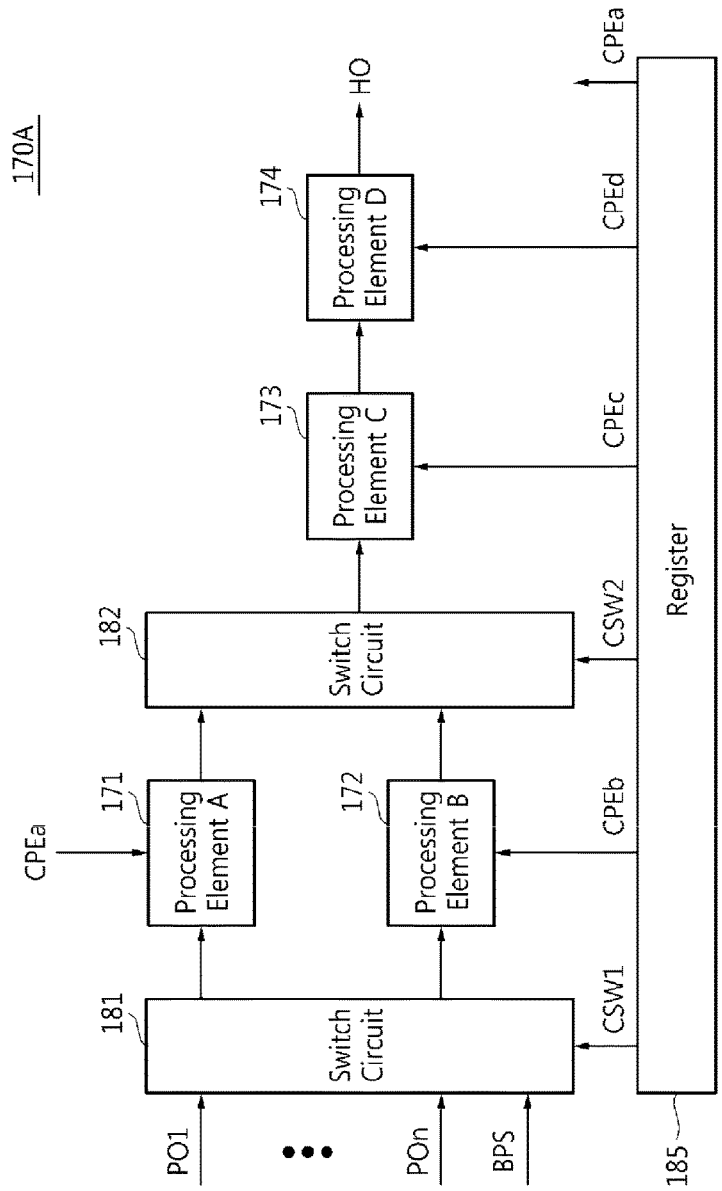
FIG. 8A is a block diagram of a hybrid data processing engine of FIG. 1 according to an exemplary embodiment.
Figure 8B:
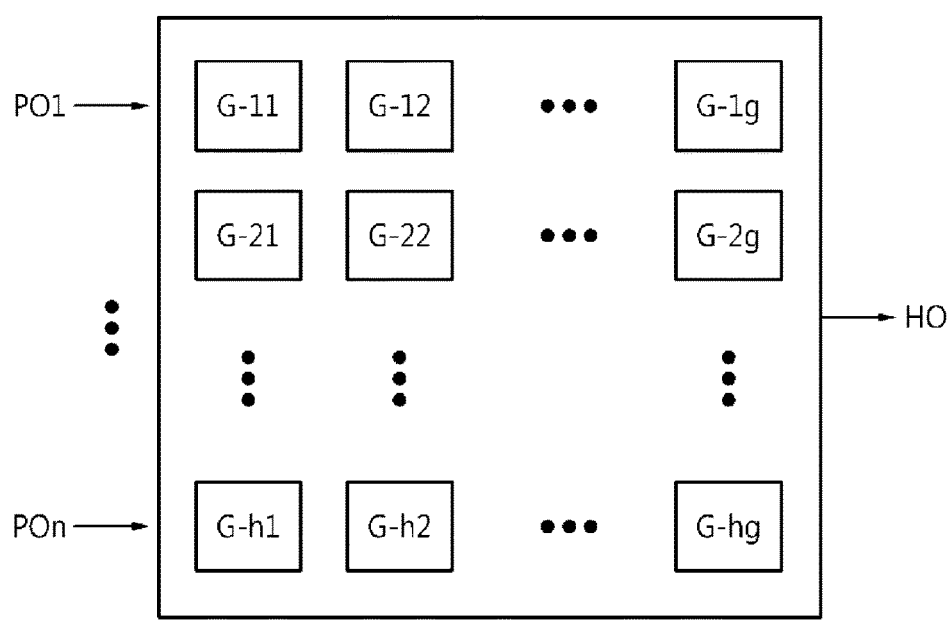
FIG. 8B is a block diagram of a hybrid data processing engine of FIG. 1 according to another exemplary embodiment.

FIG. 1A is a block diagram of a data processing system 10A according to an exemplary embodiment. FIG. 1B is a modified example of a data processing system 10A' according to an exemplary embodiment. FIG. 2 is a block diagram of a first preprocessor 130-1 of FIG. 1A according to an exemplary embodiment. FIGS. 3A and 3B are block diagrams of second preprocessors 130-2 and 130-2' of FIG. 1A according to one or more exemplary embodiments. FIG. 4 is a block diagram of a rectification engine 137 of FIG. 2 according to an exemplary embodiment. FIGS. 5 and 6 are diagrams for explaining an operation of the rectification engine 137 of FIG. 4 according to one or more exemplary embodiments. FIG. 7 is a block diagram of a converter 160-1 illustrated in FIG. 1A according to an exemplary embodiment. FIG. 8A is a block diagram of a hybrid data processing engine 170A of FIG. 1 according to an exemplary embodiment. FIG. 8B is a block diagram of a hybrid data processing engine 170B of FIG. 1 according to another exemplary embodiment;

Referring to FIGS. 1A to 1B, 2, 3A to 3B, 4 to 7, and 8A and 8B, the data processing system 10A or 10A' according to an exemplary embodiment includes a plurality of sensors, e.g., k sensors 111-1 to 111-k, and a data processing device 100A or 100A'. Here, 'k' denotes an integer that is equal to or greater than '2'.

The first to $k^{th}$ sensors 111-1 to 111-k may be homogeneous sensors (e.g., the same type of sensor) or heterogeneous sensors (e.g., different types of sensors).

Each of the first to $k^{th}$ sensors 111-1 to 111-k may be, but is not limited to, a color image sensor for capturing a two-dimensional (2D) color image, a black-and-white image sensor for capturing a 2D black-and-white image, an auto focus image sensor, a wide dynamic range sensor for increasing a dynamic range, an infrared-ray (IR) sensor for photographing an IR region, and a distant sensor (e.g., depth sensor) for measuring a distance or depth of an image or an object. Frame data, resolutions, and exposure times of the first to $k^{th}$ sensors 111-1 to 111-k may vary.

The term "dynamic range" means a maximum light-and-shade difference that can be expressed.

The auto focus image sensor may be a sensor having a phase detection function of improving auto-focusing precision.

The distant sensor is a sensor capable of measuring a distance to an object or a depth of the object, and may be embodied as, but is not limited to, a time-of-flight (TOF) sensor that measures a distance to an object by emitting light (e.g., infrared rays), onto the object, receiving light reflected from the object, and measuring a TOF.

The data processing device 100A or 100A' may receive sensor data output from two or more sensors 110 and perform data processing such as pre-processing, size control, post-processing, etc.

The data processing device 100A may include a first switching circuit 120, first to $m^{th}$ preprocessors 130-1 to 130-m, a second switching circuit 150, converters 160-1 to 160-n, and the hybrid data processing engine 170. Here, 'm' denotes an integer that is equal to or greater than '2', and 'n' denotes an integer that is equal to or greater than '1'. It is understood that in one or more other exemplary embodiments, additional components may be included and/or one or more components (e.g., at least one of the second switching circuit 150 and the converters 160-1 to 160-n) may be omitted.

The first switching circuit 120 selectively maps and connects at least two sensors among the first to $k^{th}$ sensors 111-1 to 111-k and at least two preprocessors among the first to $m^{th}$ preprocessors 130-1 to 130-m according to a first control signal CON1. That is, the first switching circuit 120 is configured to selectively map and input a plurality of sensor data from at least two sensors among the first to $k^{th}$ sensors 111-1 to 111-k to at least two preprocessors among the first to $m^{th}$ preprocessors 130-1 to 130-m.

For example, the first switching circuit 120 selectively connects outputs SO1 to SOk of the first to $k^{th}$ sensors 111-1 to 111-k and inputs PI1 to PIm of the first to $m^{th}$ preprocessors 130-1 to 130-m, so that sensor data output from at least two sensors selected from among the first to $k^{th}$ sensors 111-1 to 111-k may be input to at least two preprocessors among the first to $m^{th}$ preprocessors 130-1 to 130-m.

First to third control signals CON1 to CON3 may be output from a central processing unit (CPU) 190, although it is understood that one or more other exemplary embodiments are not limited thereto. For example, in the exemplary embodiment of FIG. 1B, the first to third control signals CON1 to CON3 may be generated by setting a register 195 included in the data processing device 100A'. The register 195 may be set by the CPU 190.

A sensor to be selected from among the first to $k^{th}$ sensors 111-1 to 111-k may vary according to a mode (e.g., a mode of operation of the data processing device 100A or 100B or of the data processing system 10A or 10A'). In this case, the mode may be set or determined by the CPU 190 or set in the register 195, and instructed via a control signal. Thus, sensors that are to be connected to the first to $m^{th}$ preprocessors 130-1 to 130-m 130-1 to 130-m by the first switching circuit 120 may also vary.

In an exemplary embodiment, 'm' may be a value that is less than or equal to 'k'.

For convenience of explanation, it is assumed that 'm' is '2'.

According to an exemplary embodiment, in a first mode, only the first and second sensors 111-1 and 111-2 among the first to $k^{th}$ sensors 111-1 to 111-k may be selected and operated. In this case, the first switching circuit 120 may connect an output of the first sensor 111-1 and an input of the first preprocessor 130-1, and an output of the second sensor 111-2 and an input of the second preprocessor 130-2 according to the first control signal CON1.

In a second mode, only the second and $k^{th}$ sensors 111-2 and 111-k among the first to $k^{th}$ sensors 111-1 to 111-k may be selected and operated. In this case, the first switching circuit 120 may connect an output of the second sensor 111-2 and an input of the first preprocessor 130-1 and an output of the $k^{th}$ sensor 111-k (e.g., a third sensor) and an input of the second preprocessor 130-2 according to the first control signal CON1.

Each of the first to $m^{th}$ preprocessors 130-1 to 130-m may perform at least one of geometrical correction and optical correction on input sensor data.

At least one of the first to $m^{th}$ preprocessors 130-1 to 130-m may rectify input sensor data based on another sensor data. To this end, at least one of the first to $m^{th}$ preprocessors 130-1 to 130-m may receive reference sensor data (e.g., the reference sensor data REF_IF1 of FIG. 2 or the reference sensor data REF_IF2 of FIG. 3B), which is information for rectifying the input sensor data.

For example, at least one of the first to $m^{th}$ preprocessors 130-1 to 130-$m$ may receive the reference sensor data REF_IF1 of FIG. 2 or the reference sensor data REF_IF2 of FIG. 3B from the CPU 190 or the register 195, and rectify the input sensor data based on the reference sensor data REF_IF1 or REF_IF2. In an exemplary embodiment, each of the first to $k^{th}$ sensors 111-1 to 111-$k$ may store sensor characteristics information thereof. The sensor characteristic information of the first to $k^{th}$ sensors 111-1 to 111-$k$ may include geometrical characteristics and optical characteristics thereof.

The CPU 190 may read the sensor characteristic information from the first to $k^{th}$ sensors 111-1 to 111-$k$, and provide at least one of the first to $m^{th}$ preprocessors 130-1 to 130-$m$ with the reference sensor data REF_IF1 or REF_IF2, based on the read sensor characteristics information. Furthermore, sensor characteristic information or sensor data may be received by one preprocessor of the first to $m^{th}$ preprocessors 130-1 to 130-$m$ from another preprocessor of the first to $m^{th}$ preprocessors 130-1 to 130-$m$.

The first preprocessor 130-1 according to an exemplary embodiment may include a lens shading corrector 131, a bad pixel corrector 133, and a chromatic aberration corrector 135, as illustrated in FIG. 2.

Lens shading refers to a phenomenon in which an image taken through a lens becomes darker in a direction from a central portion of the lens to a peripheral portion thereof due to a decrease in the amount of light, since the lens has a curved shape. The lens shading corrector 131 corrects a difference between light and shade, caused by such a difference between the amounts of light.

The bad pixel corrector 133 corrects a static bad pixel or a dynamic bad pixel caused by, for example, heat generated during manufacture of a sensor. The bad pixel corrector 133 may detect a bad pixel, correct a pixel value of the detected bad pixel, and generate a corrected pixel value.

The chromatic aberration corrector 135 corrects a chromatic aberration of a lens.

Chromatic aberration is an aberration caused by the difference between refractive indexes due to different wavelengths of light. The chromatic aberration is a phenomenon that occurs when light having a long wavelength passes through a lens and is then focused on a point that is relatively far from the lens. The chromatic aberration corrector 135 corrects such a chromatic aberration.

In an exemplary embodiment, the first preprocessor 130-1 may further include a rectification engine 137.

The rectification engine 137 performs an operation of aligning sensors to each other.

The second preprocessor 130-2 according to an exemplary embodiment may include a lens shading corrector 131, a bad pixel corrector 133, and a chromatic aberration corrector 135 as illustrated in FIG. 3A.

The second preprocessor 130-2 of FIG. 3A is differentiated from the first preprocessor 130-2 in that the second preprocessor 130-2 does not include the rectification engine 137.

The lens shading corrector 131, the bad pixel corrector 133, and the chromatic aberration corrector 135 of the second preprocessor 130-2 are substantially the same as the lens shading corrector 131, the bad pixel corrector 133, and the chromatic aberration corrector 135 of the first preprocessor 130-1, and are thus redundant descriptions thereof are omitted hereinbelow.

It is assumed in the present exemplary embodiment that the first preprocessor 130-1 includes the rectification engine 137 and the second preprocessor 130-2 does not include the rectification engine 137.

In the present exemplary embodiment, the rectification engine 137 of the first preprocessor 130-1 may rectify first sensor data SO1 based on second sensor data SO2. Here, the rectifying of the first sensor data SO1 may be understood as performing alignment such that optical and sensor characteristics of the first sensor 111-1 and the second sensor and 111-2 become the same. Here, the second sensor data SO2 may be obtained from the second sensor 111-2, another preprocessor (e.g., the second preprocessor 130-2), the register 195, or the CPU 190.

For example, when focal points of the first sensor 111-1 and the second sensor 111-2 are different from each other, the rectification engine 137 may rectify the focal point of the first sensor data SO1 according to the focal point of the second sensor data SO2.

When a horizontal line of the first sensor 111-1 and a horizontal line of the second sensor 111-2 are different, the rectification engine 137 may rectify a horizontal line of the first sensor data SO1 according to a horizontal line of the second sensor data SO2. To this end, the rectification engine 137 may receive the second sensor data SO2 including reference horizontal line information from the second preprocessor 130-2, although it is understood that one or more other exemplary embodiments are not limited thereto (e.g., the rectification engine 137 may receive the second sensor data SO2 from the second sensor 111-2, the register 195, or the CPU 190).

As described above, the rectification engine 137 may control output data of heterogeneous sensors to be the same as output data of homogeneous sensors by rectifying input sensor data according to another sensor data, or control the output data of the heterogeneous sensors to be the same as a result of sensing data under same physical environmental conditions such as same sensing position, time, angle, distance, etc. That is, data sensed by two or more sensors under at least one different physical condition may be rectified to be the same as data sensed by the two or sensors under same physical conditions. In an exemplary embodiment, the rectification engine 137 may include two or more N×N matrix multipliers 138-1 to 138-$p$ connected in a cascade form as illustrated in FIG. 4.

In the exemplary embodiment of FIG. 4, the rectification engine 137 includes first to $p^{th}$ N×N matrix multipliers 138-1 to 138-$p$. Coefficients of the first to $p^{th}$ N×N matrix multipliers 138-1 to 138-$p$ may be set by the CPU 190. Here, 'p' denotes an integer that is equal to or greater than '2'.

The rectification engine 137 may rectify data RE1 by performing at least one of transition, rotation, and scaling, based on the coefficients of the first to $p^{th}$ N×N matrix multipliers 138-1 to 138-$p$.

FIGS. 5 and 6 are images illustrating examples of data that has yet to be rectified by the rectification engine 137 of FIG. 4 and data that is rectified by the rectification engine 137. First, referring to FIG. 5, an image of FIG. 5($a$) may be or may correspond to second sensor data SO2 and an image of FIG. 5($b$) may be or may correspond to first sensor data SO1 that has yet to be rectified.

Before the rectification engine 137 rectifies the first sensor data SO1, horizontal lines of the first sensor data SO1 and the second sensor data SO2 are not aligned to each other as illustrated in FIG. 5.

Referring to FIG. 6, an image of FIG. 6(a) may be or may correspond to the second sensor data SO2 and an image of FIG. 6(b) may be or may correspond to a result of rectifying the first sensor data SO1.

The rectification engine 137 may rectify the horizontal line of the first sensor data SO1 by rotating the first sensor data SO1 by a specific angle in a clockwise direction. The specific angle may be set based on the coefficients of the first to $p^{th}$ N×N matrix multipliers 138-1 to 138-$p$. As described above, after the horizontal line of the first sensor data SO1 is rectified by the rectification engine 137, the horizontal lines of the first sensor data SO1 and the second sensor data SO2 are aligned to each other as illustrated in FIG. 6.

In an exemplary embodiment, the second preprocessor 130-2' of FIG. 3B may include a rectification engine 137-2, unlike the second preprocessor 130-2 of FIG. 3A.

In this case, the first preprocessor 130-1 and the second preprocessor 130-2' may rectify sensor data thereof, based on the reference sensor information REF_IF1 and REF_IF2 thereof. The first and second reference sensor information REF_IF1 and REF_IF2 may be the same. In this case, the first preprocessor 130-1 and the second preprocessor 130-2' may rectify data of heterogeneous sensors under same conditions.

Referring back to FIG. 1A, the second switching circuit 150 may connect the first to $m^{th}$ preprocessors 130-1 to 130-$m$ such that preprocessed data PO1 to POm output from the first to $m^{th}$ preprocessors 130-1 to 130-$m$ are input to at least one converter among the converters 160-1 to 160-$n$ or are directly input to the hybrid data processing engine 170, according to the second control signal CON2. Here, 'n' denotes an integer that is equal to or greater than '1'.

That is, the second switching circuit 150 may selectively connect the preprocessed data PO1 to POm output from the first to $m^{th}$ preprocessors 130-1 to 130-$m$ and data RI1 to RIn input to the converters 160-1 to 160-$n$ or may bypass the converters 160-1 to 160-$n$.

Each of the first switching circuit 120 and the second switching circuit 150 may include a multiplexer and/or a demultiplexer.

The converters 160-1 to 160-$n$ may convert the resolutions or formats of the data RI1 to RIn input thereto.

Referring to FIG. 7, the converter 160-1 may include a size converter 161 and a format converter 163. The size converter 161 converts the spatial resolution of the input data RI1 based on size information SIZE_IF. The format converter 163 converts the pixel format of the input data RI1 based on format information FM_IF. The size information SIZE_IF and the format information FM_IF may be provided by the CPU 190 or the register 195.

In an exemplary embodiment, a connection between the size converter 161 and the format converter 163 may be changed. For example, as illustrated in FIG. 7, the spatial resolution of the input data RI1 may be adjusted and then the pixel format of the input data RI1 may be converted, and vice versa.

In another exemplary embodiment, the size converter 161 and/or the format converter 163 may be bypassed. For example, the pixel format of the input data RI1 may be converted without adjusting the spatial resolution of the input data RI1 by bypassing the size converter 161, and the spatial resolution of the input data RI1 may be adjusted without converting the pixel format of the input data RI1 by bypassing the format converter 163.

In an exemplary embodiment, the converters 160-1 to 160-$n$ may control the spatial resolutions of the preprocessed data PO1 to POm to be the same. For example, when the resolution of the preprocessed data PO1 output from the first preprocessor 111-1 is less than that of the preprocessed data PO2 output from the second preprocessor 111-2, the converter 160-1 may increase the resolution of the preprocessed data output from the first preprocessor 111-1 to be the same as the resolution of the second preprocessor 111-2.

As another example, when the resolution of the preprocessed data PO1 output from the first preprocessor 111-1 is greater than the resolution of the preprocessed data PO2 output from the second preprocessor 111-2, the converter 160-1 may decrease the resolution of the preprocessed data PO1 output from the first preprocessor 111-1 to be the same as the resolution of the preprocessed data PO2 output from the second preprocessor 111-2. If it is assumed that the resolution of a first sensor 111-1 and the resolution of a second sensor 111-2 are different from each other, the converters 160-1 to 160-$n$ may perform up-scaling or down-scaling to equalize the resolutions of these sensors 111-1 and 111-2.

In an exemplary embodiment, the converters 160-1 to 160-$n$ may equalize pixel formats of the input data RI1 to RIn. For example, the pixel formats may be RGB444, ARGB888, and YCbCr422, but are not limited thereto.

The hybrid data processing engine 170 may receive two or more pieces of sensor data, and perform image enhancement such as noise reduction, generation of a high dynamic range image, de-focusing, contrast extension or enhancement, etc., extract distance (depth) information, generate additional information by detecting or recognizing an object, etc.

That is, the hybrid data processing engine 170 may output an enhanced image or extract information by using at least two pieces of the preprocessed sensor data preprocessed by the first to $m^{th}$ preprocessors 130-1 to 130-$m$.

Two or more pieces of preprocessed sensor data input to the hybrid data processing engine 170 may be data, the size of which is controlled by the converters 160-1 to 160-$m$, or may be data obtained by bypassing the converters 160-1 to 160-$m$ (e.g., according to a control signal received from the register 195 or the CPU 190, or where the converters 160-1 to 160-$m$ are omitted in another exemplary embodiment).

Referring to FIG. 8A, the hybrid data processing engine 170A may include a plurality of processing elements PE, e.g., two or more processing elements PE. Here, the plurality of processing elements PE may be hardware components or elements.

The hybrid data processing engine 170A may perform two or more operations according to a combination of a plurality of processing elements PE.

Whether each of the plurality of processing elements PE is to be used and a connection between the plurality of processing elements PE may be controlled by the CPU 190 of FIG. 1A or the register 195 of FIG. 1B. For example, the CPU 190 may determine whether each of the plurality of processing elements PE is to be used (or to be bypassed) or differently determine a connection between the plurality of processing elements PE according to a mode.

In the present exemplary embodiment of FIG. 8A, the hybrid data processing engine 170A includes four processing elements, i.e., first to fourth processing elements 171, 172, 173, and 174, although it is understood that the number of processing elements is variable in one or more other exemplary embodiments.

Also, in the present exemplary embodiment, the hybrid data processing engine 170A includes third and fourth switching circuits 181 and 182 to control a connection among the processing elements 171, 172, 173, and 174.

However, it is understood that one or more other exemplary embodiments are not limited thereto.

At least one of the first to fourth processing elements 171 to 174 may perform at least one of noise reduction, defocusing, dynamic range enhancement, and contrast enhancement.

In an exemplary embodiment, in the first mode, the hybrid data processing engine 170A may output an image, the dynamic range of which is enhanced using the first and second processing elements 171 and 172. In this case, the third and fourth processing elements 173 and 174 may be bypassed according to corresponding control signals CPEc and CPEd.

In the second mode, the hybrid data processing engine 170A may calculate disparity map data using the first, third, and fourth processing elements 171, 173, and 174.

As described above, according to an exemplary embodiment, the hybrid data processing engine 170A may be configured to perform a different function by differently combining processing elements PE each having a specific image processing function according to a mode.

Referring to FIG. 8B, a hybrid data processing engine 170B may include a field programmable gate array (FPGA) implemented based on magnetic random access memory (MRAM). For example, the hybrid data processing engine 170B may include a gate array including a plurality of logic gates G-11 to G-hg. A connection among the plurality of logic gates G-11 to G-hg is programmable. Thus, a different operation may be performed by differently connecting the plurality of logic gates G-11 to G-hg of the hybrid data processing engine 170B according to a mode.

In an exemplary embodiment, data paths may be established among the components of FIG. 1A in an on-the-fly manner without using a memory.

For example, a data path may be connected from the first to k$^{th}$ sensor 111-1 to 111-k to the first to m$^{th}$ preprocessors 130-1 to 130-m in the on-the-fly manner, a data path may be connected from the first to m$^{th}$ preprocessors 13-1 to 13-m to the converters 160-1 to 160-n in the on-the-fly manner, and a data path may be connected from the converters 160-1 to 160-n t to the hybrid data processing engine 170, 170A, or 170B in the on-the-fly manner. Furthermore, the hybrid data processing engine 170, 170A, or 170B may receive the plurality of sensor data from at least two of the preprocessors 130-1 to 130-m via an on-the-fly method without a direct memory access.

When each of the data paths is connected in the on-the-fly manner as described above, data does not need to be read from or written to a memory (e.g., a memory external to the data processing device 100A or 100A', thereby decreasing a memory bandwidth and power consumption caused by memory accessing.

However, according to another exemplary embodiment, direct memory access (DMA) may be used in at least one of the data paths and thus data may be transmitted from one component to another component via a memory.

Figure 9A:
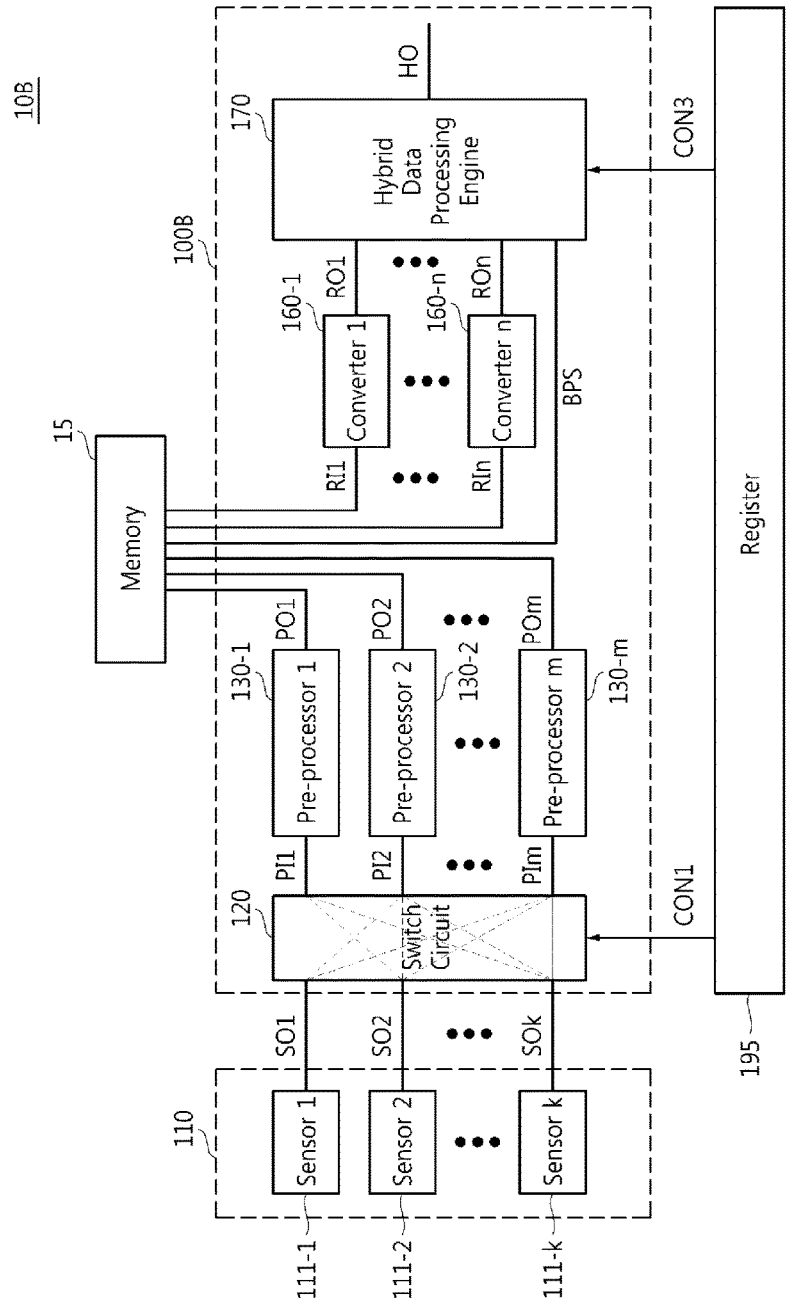
FIG. 9A is a block diagram of a data processing system according to another exemplary embodiment.

FIG. 9A is a block diagram of a data processing system 10B according to another exemplary embodiment. Referring to FIG. 9A, in the data processing system 10B, output data PO1 to POm of first to m$^{th}$ preprocessors 130-1 to 130-m may be stored in a memory 15. First to n$^{th}$ converters 160-1 to 160-n may read the output data PO1 to POm of the first to m$^{th}$ preprocessors 130-1 to 130-m from the memory 15, and process the output data PO1 to POm.

Figure 9B:
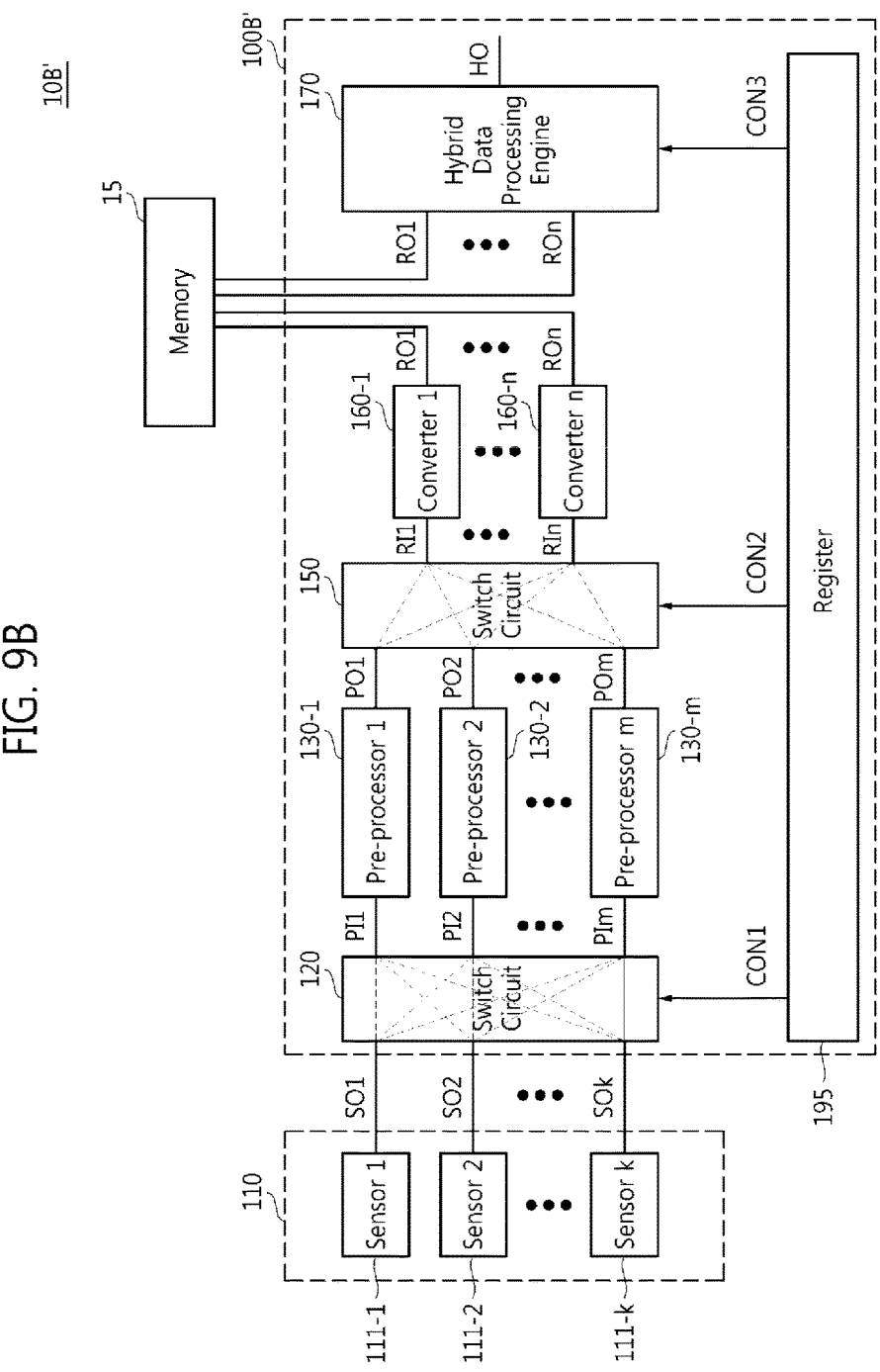
FIG. 9B is a modified example of a data processing system according to another exemplary embodiment.

FIG. 9B is a modified example of a data processing system 10B' of the data processing system 10B of FIG. 9A according to an exemplary embodiment. Referring to FIG. 9B, in the data processing system 10B', output data RO1 to ROn of first to n$^{th}$ converters 160-1 to 160-n may be stored in a memory 15. A hybrid data processing engine 170 may read the output data RO1 to ROn of the first to n$^{th}$ converters 160-1 to 160-n from the memory 15, and process the output data RO1 to ROn.

As described above, in the data processing systems 10A, 10A', 10B, and 10B', data may be transmitted between one component and another component in the on-the-fly manner, may be transmitted between one component and another component via the memory 15, or may be transmitted via different components according to an on-the-fly manner or a memory access manner that may vary from one data path to another. Also, in an exemplary embodiment, a plurality of sensors 111-1 to 111-k and a data processing device 100A, 100A', 100B, or 100B' may be connected in a wired and/or wireless manner.

In the exemplary embodiments of FIGS. 1A, 1B, 9B, and 9B, each of the components may be bypassed under control of the CPU 190 or according to setup of the register 195.

In the exemplary embodiment of FIG. 1A, the CPU 190 is provided outside the data processing device 100A. In another exemplary embodiment, the CPU 190 may be provided in the data processing device 100A.

Figure 10:
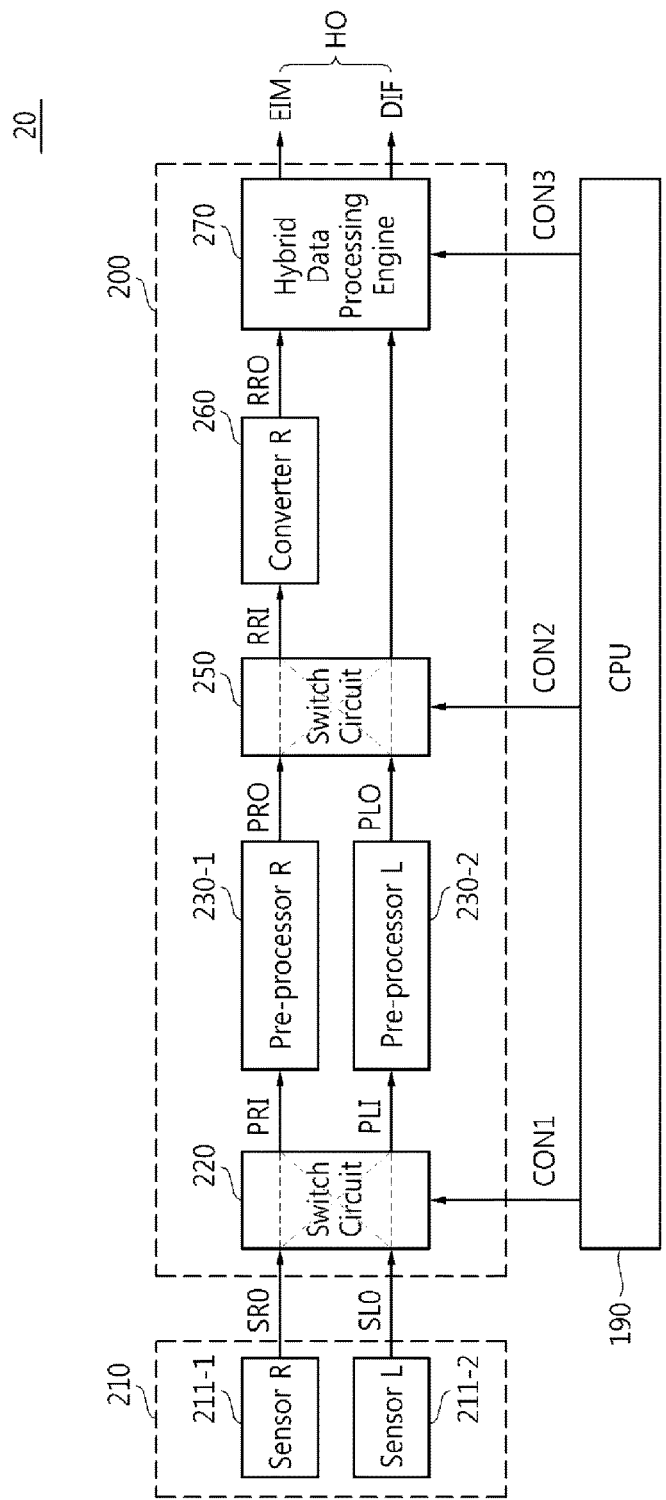
FIG. 10 is a block diagram of a data processing system according to another exemplary embodiment.
Figure 11:
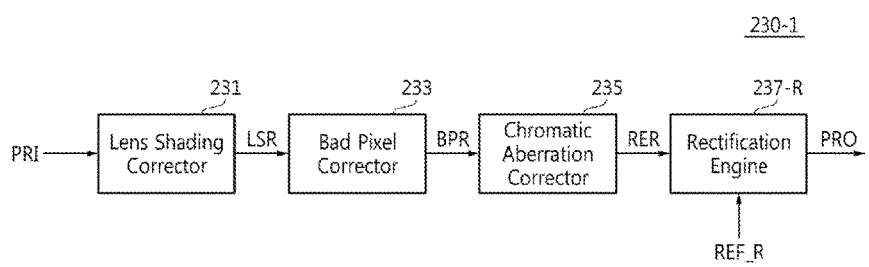
FIG. 11 is a block diagram of a first preprocessor of FIG. 10 according to another exemplary embodiment.
Figure 12:
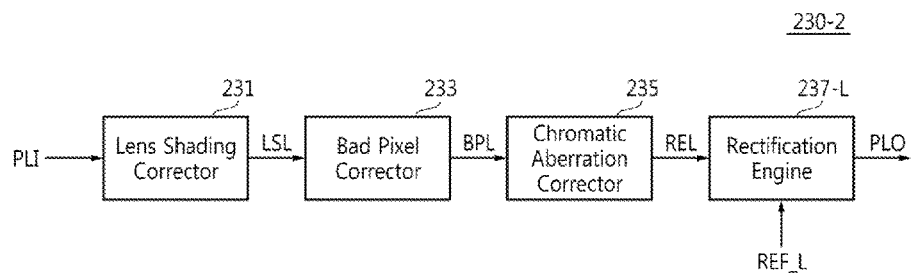
FIG. 12 is a block diagram of a second preprocessor of FIG. 11 according to another exemplary embodiment.

FIG. 10 is a block diagram of a data processing system 20 according to another exemplary embodiment. FIG. 11 is a block diagram of a first preprocessor 230-1 of FIG. 10 according to another exemplary embodiment. FIG. 12 is a block diagram of a second preprocessor 230-2 of FIG. 10 according to another exemplary embodiment.

Referring to FIGS. 10 to 12, the data processing system 20 includes first and second sensors 211-1 to 211-2 and a data processing device 200.

The first sensor (sensor R) 211-1 may be a camera sensor corresponding to a user's right eye. The second sensor (sensor L) 211-2 may be a camera sensor corresponding to the user's left eye. The first and second sensors 211-1 and 211-2 may be different in terms of at least one of a focal length, optical characteristics of a lens, sensor distortion, and signal characteristics.

The data processing device 200 may include a first switching circuit 220, the first and second preprocessors 230-1 to 230-2, a second switching circuit 250, a converter 260, and a hybrid data processing engine 270. However, it is understood that in one or more other exemplary embodiments, additional components may be included and/or one or more components (e.g., at least one of the second switching circuit 250 and the converter 260) may be omitted. The structure and operations of the data processing device 200 are substantially the same as or similar to those of the data processing devices 100A and 100A' of FIGS. 1A and 1B. Thus, redundant descriptions thereof are omitted hereinbelow.

Referring to FIGS. 10, 11, and 12, each of the first and second preprocessors 230-1 to 230-2 may include a lens shading corrector 231, a bad pixel corrector 233, a chromatic aberration corrector 235, and a rectification engine 237-R or 237-L.

The structures of the first and second preprocessors 230-1 to 230-2 are substantially the same as or similar to those of the first and second preprocessors 130-1 to 130-2 of FIGS. 2 and 3A.

However, the rectification engine 137 is included in only the first preprocessor 130-1 among the first and second preprocessors 130-1 to 130-2 of FIGS. 2 and 3A, whereas the rectification engines 237-R and 237-L are included in the first and second preprocessors 230-1 to 230-2 of FIGS. 11 and 12, respectively (although it is understood that one or more other exemplary embodiments are not limited thereto).

In this case, the first rectification engine 237-R and the second rectification engine 1237-L may rectify images input thereto to align first and second sensor data SRO and SLO to each other.

For example, in a mode in which a stereo image is created using the first and second sensor data SRO and SLO, the first rectification engine 137-R and the second rectification engine 137-L may perform deviation rectification to remove vertical parallax from the first and second sensor data SRO and SLO, respectively.

An output of the first preprocessor 230-1 may be input to the converter 260 by the second switching circuit 250. An output of the second preprocessor 230-2 may be input to the hybrid data processing engine 270 by the second switching circuit 250. The converter 260 may up-scale or down-scale the output of the first preprocessor 230-1 to equalize the resolution of output data of the first preprocessor 230-1 and the resolution of output data of the second preprocessor 230-2.

The hybrid data processing engine 270 receives and processes the output data of the converter 260 and the output data of the second preprocessor 230-2 together.

In an exemplary embodiment, the converter 260 may be bypassed. That is, the output data of the first preprocessor 230-1 may be also be directly input to the hybrid data processing engine 270.

The structure and operations of the hybrid data processing engine 270 may be substantially the same as or similar to those of the hybrid data processing engine 170 of FIG.

In an exemplary embodiment, in the first mode, the hybrid data processing engine 270 may calculate a disparity between pixels, based on two pieces of input data RRO and PLO, and output disparity map data or distance data.

In an exemplary embodiment, in the second mode, exposure times of the first and second sensors 211-1 and 211-2 may be set to be different, and the hybrid data processing engine 270 may generate a high dynamic range image from the two pieces of input data RRO and PLO. In this case, the exposure time of the first sensor 211-1 may be set to be long, and the exposure time of the second sensor 211-2 may be set to be short.

In the above-described exemplary embodiment, an image may be enhanced or additional information may be generated by correcting homogeneous or heterogeneous multiple sensor data by a random or a predetermined number of preprocessors and combining results of correcting the homogeneous or heterogeneous multiple sensor data.

Figure 13:
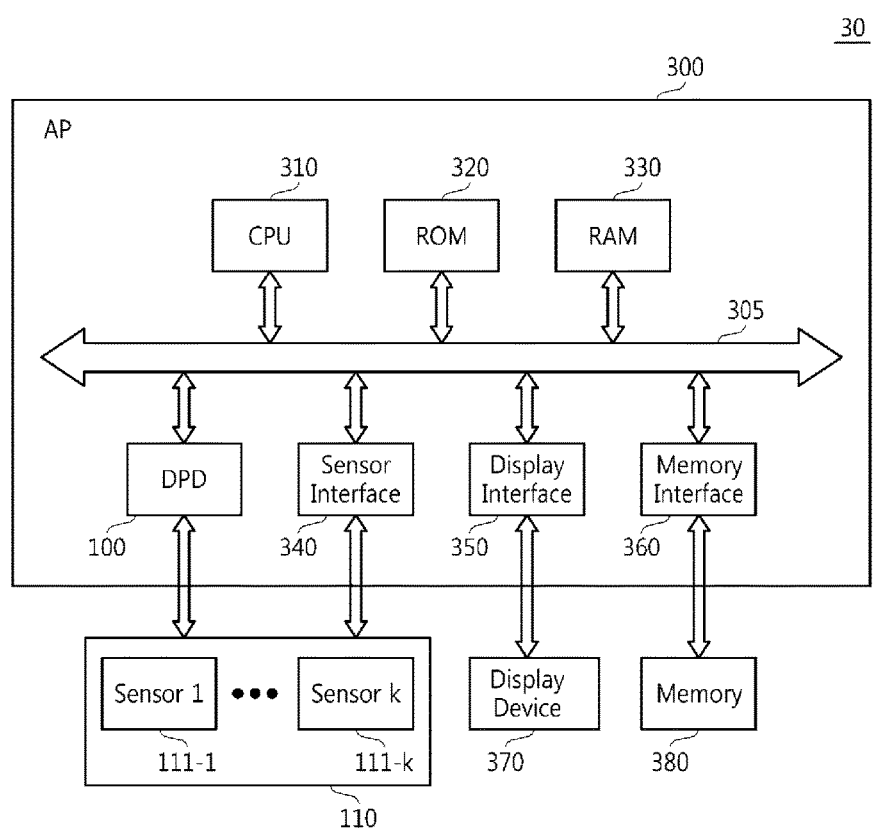
FIG. 13 is a block diagram of a data processing system according to another exemplary embodiment.
Figure 14A:
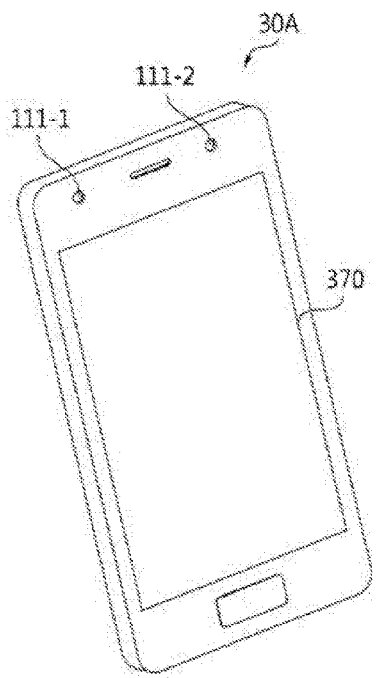
FIGS. 14A and 14B illustrate an example of the exterior of the data processing system of FIG. 13, according to an exemplary embodiment.
Figure 14B:
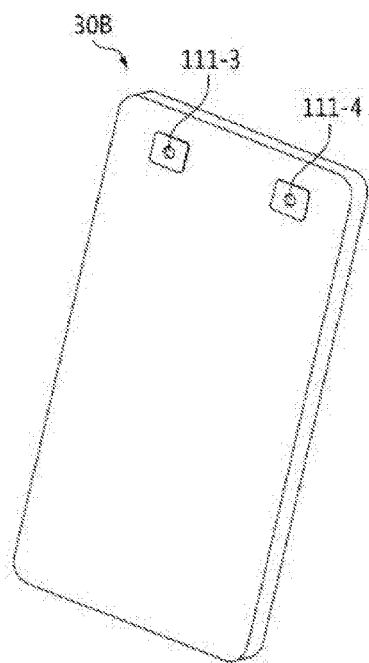

FIG. 13 is a block diagram of a data processing system 30 according to another exemplary embodiment. FIGS. 14A and 14B illustrate an example of the exterior of the data processing system 30 of FIG. 13.

Referring to FIGS. 13, 14A and 14B, the data processing system 30 may be a mobile terminal, e.g., a smart phone, a tablet personal computer (PC), a personal digital assistant (PDA), an enterprise digital assistant (EDA), a mobile internet device (MID), an e-book, a portable multimedia player (PMP), a digital camera, etc.

The data processing system 30 may include an application processor 300, a plurality of sensors 110, a display device 370, and a memory 380.

The plurality of sensors 110 may include first and second camera sensors 111-1 and 111-2 disposed on a front surface 30A of the data processing system 30, and third and fourth camera sensors 111-3 and 111-4 disposed on a rear surface 30B of the data processing system 30, as illustrated in FIGS. 14A and 14B.

The first and second camera sensors 111-1 and 111-2 disposed on the front surface 30A may be used to recognize a user's face or to capture a stereo image of a background and/or an object in front of the data processing system 30.

The third and fourth camera sensors 111-3 and 111-4 disposed on the rear surface 30B may be used to capture a stereo image of a background and/or an object behind the data processing system 30 or to obtain a high dynamic range image by differently setting conditions (e.g., exposure times, focal points, etc.) of the third and fourth camera sensors 111-3 and 111-4.

Thus, according to an application program 300 driven by the data processing system 30 or a menu selected by a user, the data processing system 30 may select at least two sensors from among the plurality of sensors 111-1 to 111-3 and combine and process sensor data output from the at least two sensors, thereby performing different functions.

In order to perform different operations, a connection between data paths established by the first switching circuit 220 and the second switching circuit 250, whether each of the plurality of processing elements PE of the hybrid data processing engine 170 is to be used or not, and a connection between the plurality of processing elements PE may be differently set or may vary as described above with reference to FIGS. 1A to 1B, 2, 3A to 3B, 4 to 7, and 8A to 8B.

The application processor 300 may include a central processing unit (CPU) 310, a read only memory (ROM) 320, a random access memory (RAM) 330, a data processing device (DPD) 100, a sensor interface 340, a display interface 350, and a memory interface 360.

The application processor 300 may be a system-on-chip (SoC). The components 310, 320, 330, 100, 340, 350, and 360 of the application processor 300 may exchange data with one another via a bus 305.

The CPU 310 may control overall operations of the application processor 300. For example, the CPU 310 may process or execute programs and/or data stored in the ROM 320 and/or the RAM 330.

In an exemplary embodiment, the CPU 310 may be a computing component with two or more independent processors (or cores), i.e., a multi-core processor.

The ROM 320 may store programs and/or data that are continuously used. In an exemplary embodiment, the ROM 320 may be an erasable programmable ROM (EPROM), an electrically erasable programmable ROM (EEPROM), or the like.

The RAM 330 may temporarily store programs, data, and/or instructions. In an exemplary embodiment, the RAM 330 may be a dynamic RAM (DRAM) or a static RAM (SRAM).

The RAM 330 may temporarily store data that is input or output via the interfaces 340, 350, and 360 or data generated by the CPU 310.

According to one or more exemplary embodiments, the data processing device 100 is substantially the same as or similar to the data processing device 100A, 100A', 100B, and 100B' of FIGS. 1A, 1B, 9A, and 9B. The data processing device 100 may thus perform preprocessing, resizing, processing, etc., on image data received from the first to $k^{th}$ sensors 111-1 to 111-$k$ and output the processed image data to the RAM 330, the display interface 350, or the memory interface 360.

According to another exemplary embodiment, the data processing device 100 is substantially the same as or similar to the data processing device 200 of FIG. 10.

The sensor interface 340 may control the first to $k^{th}$ sensors 111-1 to 111-k. In an exemplary embodiment, the sensor interface 340 and the data processing device 100 may be embodied in the form of one module.

The display interface 350 may interface data to be output to the display device 370 outside the application processor 300, e.g., image data.

The display device 370 may output an image or data related to an image via a display such as a liquid-crystal display (LCD), active matrix organic light emitting diode (AMOLED) display, etc.

The memory interface 360 may interface data that is input from or to be output to the memory 380 outside the application processor 300.

In an exemplary embodiment, the memory 380 may be a non-volatile memory, e.g., a flash memory, a resistive memory, etc.

As described above, a data processing system according to an exemplary embodiment may include at least two sensors on a front surface thereof to photograph a user or recognize a photographer's face, and may additionally include at least two sensors on a rear surface thereof to obtain stereo images, etc. As described above, according to an exemplary embodiment, when a plurality of sensors are provided, various functions may be performed by differently combining data processors rather than preparing a plurality of data processing devices corresponding to the plurality of sensors.

Thus, since a plurality of data processing devices corresponding to the plurality of sensors do not need to be additionally prepared, functions or operations may be prevented from being redundant, thereby preventing an increase in system size and power consumption due to redundant functions or operations.

Also, according to an exemplary embodiment, memory accessing in data paths established from sensors to a hybrid data processing engine may be minimized, thereby preventing an increase in a bandwidth and power consumption, caused by inputting data to or outputting data from a memory.

Figure 15:
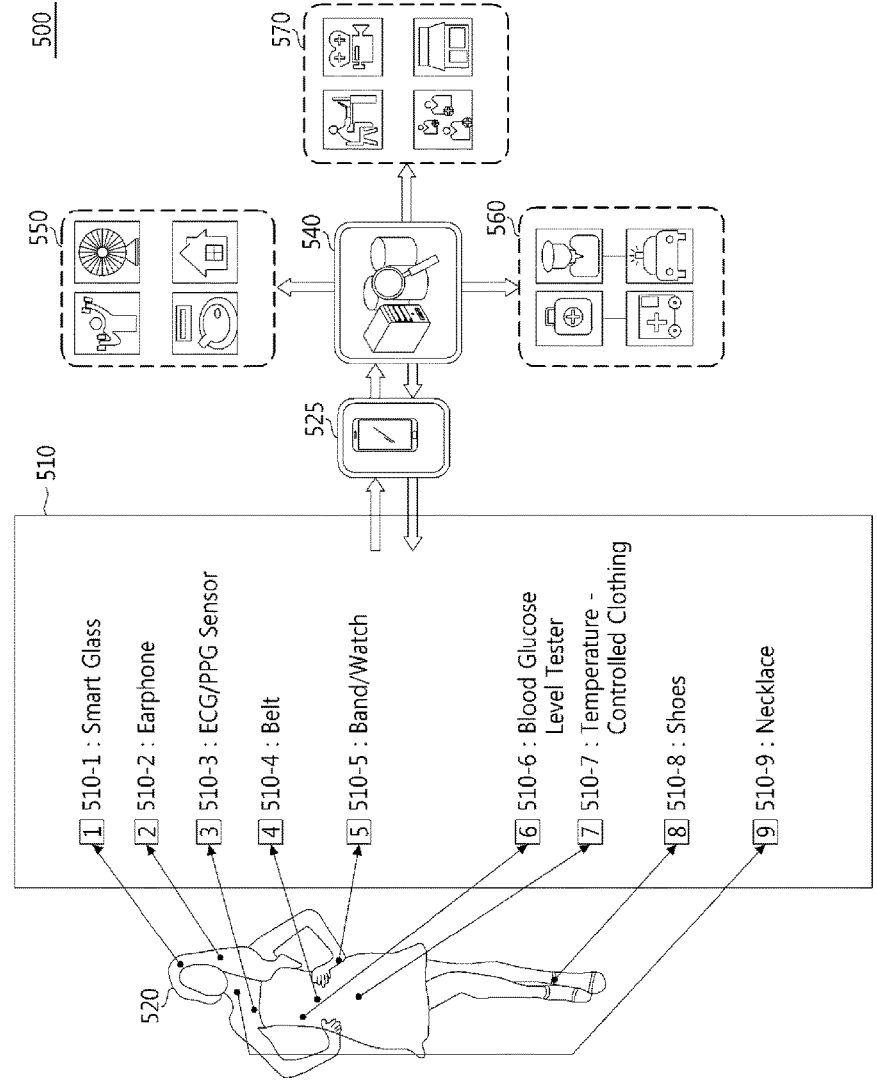
FIG. 15 is a conceptual diagram of an IoT service system in which a data processing device according to one or more exemplary embodiments can be used.

FIG. 15 is a conceptual diagram of an Internet of Things (IoT) service system 500 in which a data processing device 100A, 100A', 100B, 100B', or 200 according to one or more exemplary embodiments can be used. FIG. 15 shows a usage scenario for health, personal safety, social network service (SNS), information provision, smart home service, etc. Referring to FIG. 15, the IoT service system 500 may include at least one IoT device 510, a gateway 525, a server 540, and one or more service providers 550, 560, and 570.

The IoT device 510 may be implemented as a wearable device 510 such as a smart glass 510-1, an earphone 510-2, an electrocardiography (ECG)/photoplethysmogram (PPG) sensor 510-3, a belt 510-4, a band or watch 510-5, a blood glucose level tester 510-6, temperature-adjustable clothing 510-7, shoes 510-8, or a necklace 510-9. The wearable device 510 may include a sensor that senses the condition of a user 520, a surrounding environment, and/or a user command. The sensor included in the wearable device 510 may be any of the first through k-th sensors 111-1 through 111-k. The IoT device 510 may also have a replaceable embedded battery for power supply or a wireless charging function and may include a wireless communication function for communication with outside world.

The gateway 525 may transmit information collected by the sensor to the server 540 through a communication network and may transmit analyzed information from the server 540 to the IoT device 510. The gateway 525 may be connected with the IoT device 510 using a wireless local area network protocol. The gateway 525 may be a smart phone which can be connected to a wireless network such as Wi-Fi, 3G, or LTE. The gateway 525 may include the data processing device 100 according to some embodiments of the inventive concept. The data processing device 100 of the gateway 525 may perform correction/rectification and size/resolution conversion on sensor data collected from a plurality of sensor and may generate information by post-processing and combining corrected/rectified/converted data.

The gateway 525 may be connected to the server 540 through an internet or a wireless network. The server 540 may store or analyze collected information to generate relevant service information or may provide the stored information and/or analyzed information for the service providers 550, 560, and 570. Here, a service may refer to providing information useful to the user 520, giving an alarm, offering personal protection information, providing control information of the wearable IoT device 510, etc.

The smart glass 510-1 may be worn on or mounted to the head of the user 520 to sense an environment surrounding the user 520, the condition of the user 520, and a command of the user 520 using sensors such as a dry eye sensor, an eye blink sensor, an image sensor, a brainwave sensor, a touch sensor, a voice recognition sensor, a global positioning system (GPS) chip or sensor. The sensed information may be transmitted to the server 540 and the server 540 may provide a useful service for the user 520. For instance, the server 540 may provide electrostimulation information for treating abnormal brainwaves for the user 520 based on brainwave information received from the user 520, so that the abnormal brainwaves of the user 520 is treated or the mood of the user 520 is adjusted through the smart glass 510-1.

The earphone 510-2 may be inserted into the ear of the user 520 or worn on the ear of the user 520 to cover the ear to sense physical information and commands of the user 520 through sensors such as a temperature sensor, an image sensor, a touch sensor, a proximity sensor, a motion sensor, a gesture sensor, a heart rate sensor, etc. The ECG or PPG machine may measure ECG of the user 520 using an ECG sensor. The belt 510-4 may include a sensor for measuring the waist, respiration, or obesity of the user 520 and may have a vibration or electrostimulation function for treating obesity or pain. The band/watch 510-5 may include sensors relevant to temperature, heartbeat, sleep, atmospheric pressure, ultraviolet rays, oxygen saturation, optics, gyro, GSP, PPG, ECG, skin conductance, and passometer regarding the user 520 and may also have a gas spray function for fighting off sexual harassers. The blood glucose level tester 510-6 may include a sensor for measuring a blood glucose level of the user 520. The sensor for measuring a blood glucose level may be a noninvasive sensor. The measured blood glucose level may be transmitted to the server 540 through the smart phone or gateway 525 of the user 520.

The temperature-adjustable clothing 510-7 may include a sensor for measuring body temperature of the user 520 or ambient temperature. The temperature-adjustable clothing 510-7 may compare the measured temperature with a predetermined temperature and control the cooling or heating function of the temperature-adjustable clothing 510-7. By way of example, the temperature-adjustable clothing 510-7 may be a diaper or underwear for babies or adults. A diaper or underwear may be equipped with a skin conductance sensor, a temperature sensor, a test paper sensor, or a hydraulic pressure sensor to sense the condition of the user 520 and inform a time to be replaced or perform the cooling or heating function. The diaper or underwear may include a fine hot wire and/or a cooling pipe for the cooling/heating function.

The shoe 510-8 may include a sensor for the weight of the user 520, the pressure of different portions of the foot of the user 520, air pollution inside the shoe, humidity, odor, GPS, steps, activity, etc. Information collected by the sensor may be transmitted to the server 540 and the server 540 may provide information about posture correction or an alarm signaling time to clean or replace the shoe for the user 520. The shoe 510-8 may directly provide the information for the user 520 through an application installed in the smart phone or gateway 525 of the user 520.

The necklace 510-9 may be worn around the neck of the user 520 and may include a sensor for sensing respiration, pulse, body temperature, amount of activity, calorie consumption, GPS, brainwave, voice, ECG, PPG, audio, etc. Information collected by the sensor may be directly analyzed in the IoT device 510 or may be transmitted to the server 540. The service providers 550, 560, and 570 may provide the user 520 relevant service based on user information received from the server 540. For instance, the necklace 510-9 may be worn on a dog to sense the voice of the dog and the service providers 550, 560, and 570 may provide voice translation service based on the sensed information. The translation service information may be output through a speaker embedded in the necklace 510-9 or to an external audio device.

Figure 16:
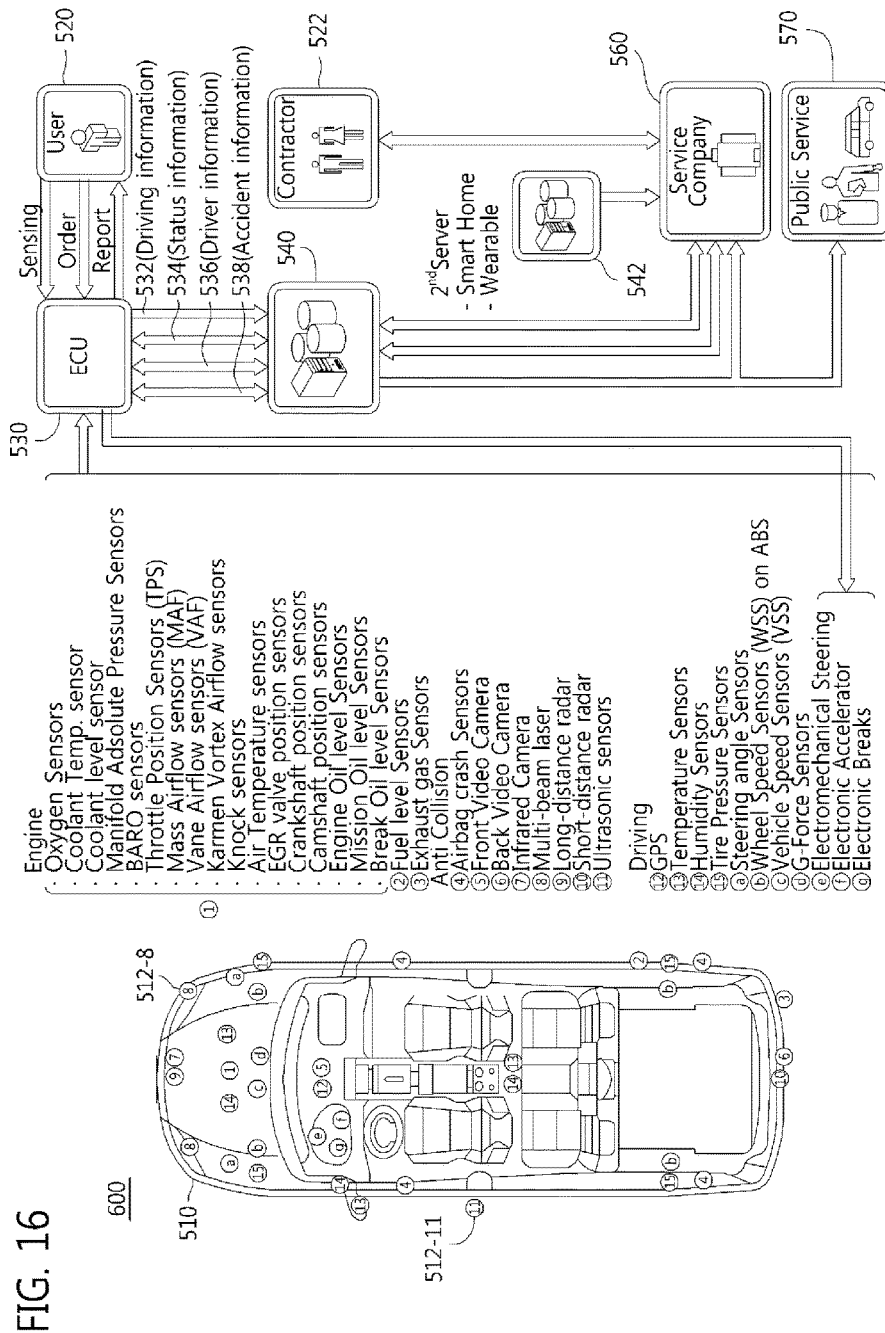
FIG. 16 is a conceptual diagram of an IoT service system which can be applied to a vehicle according to one or more exemplary embodiments.

FIG. 16 is a conceptual diagram of an IoT service system 600 that can be applied to a vehicle according to one or more exemplary embodiments. FIG. 16 shows a usage scenario for traffic control, anti-collision, vehicle driving service, etc. Referring to FIG. 16, the service system 600 includes a vehicle 510 including a plurality of sensors 512-1 through 512-G. The sensors 512-1 through 512-G may correspond to the sensors 111-1 through **111-*k*. The service system 600 may also include an engine control unit (ECU) 530, the server 540, and one or more service providers 560 and 570**.

The sensors 512-1 through 512-G may include at least one of an engine unit sensor 512-1, anti-collision sensors 512-4 through 512-11, and vehicle driving sensors 512-12 through 512-G. The sensors 512-1 through 512-G may also include a fuel level sensor 512-2 and/or an exhaust gas sensor 512-3.

The engine unit sensor 512-1 may include at least one of an oxygen sensor, a coolant temperature sensor, a coolant level sensor, a manifold absolute pressure (MAP) sensor, a baro pressure sensor (BPS), a throttle position pressure sensor (TPS), a mass airflow (MAF) sensor, a vane airflow sensor, a Karman vortex airflow sensor, a knock sensor, an air temperature sensor, an exhaust gas recirculation (EGR) valve position sensor, a crankshaft position sensor, a camshaft position sensor, an engine oil level sensor, a mission oil level sensor, a break oil level sensor, etc.

The BPS may measure an atmospheric pressure and send the measured atmospheric pressure to the ECU 530 to correct the amount of fuel injection and ignition timing. The MAP sensor provides the ECU 530 volume information using a manifold pressure and the MAF sensor provides the ECU 530 information about the mass of airflow so that the amount of fuel is determined. The vane airflow sensor includes a vane, which moves in an engine airflow system, connected to a variable resistor. The Karman vortex airflow sensor is a hot wire type and/or hot film type airflow sensor.

The knock sensor is a sort of acceleration sensor which senses the occurrence of knocking in a knock sensor engine. The EGR valve position sensor allows the oxygen sensor to send a signal value to the ECU 530 when there is a lot of CO or HC in combustion gas, so that the ECU 530 sends the signal value to an EGR solenoid valve to re-circulate exhaust gas. The crankshaft position sensor senses an engine RPM and an accurate position of a piston. The camshaft position sensor is provided to control fuel injection timing and ignition timing.

The anti-collision sensors 512-4 through 512-11 may include an airbag crash sensor, a front video camera, a back video camera, an infrared camera, a multi-beam laser, a long-distance radar, a short-distance radar, and an ultrasonic sensor.

The vehicle driving sensors 512-12 through 512-G may include at least one among a global positioning system (GPS), a temperature sensor, a humidity sensor, a tire pressure sensor, a steering angle sensor, a wheel speed sensor (WSS) on an anti-lock brake system (ABS), a vehicle speed sensor (VSS), a G-force sensor, an electromechanical steering system, an electronic accelerator, electronic brakes, a pitch sensor, a height sensor (e.g., wheel height), an acceleration sensor, a tilt sensor, etc.

The ECU 530 may collect driving information 532 received from the sensors 512-1 through 512-G and transmit the driving information 532 to the server 540 through a communication network. The server 540 may include the data processing device 100 according to one or more exemplary embodiments. The data processing device 100 of the server 540 may perform correction/rectification and size/resolution conversion on sensor data collected from the sensors 512-1 through 512-G and may generate information by post-processing and combining corrected/rectified/converted data. At this time, the ECU 530 and the server 540 may communicate status information 534, driver information 536, and/or accident information 538 with each other.

The service company 560 may provide various services such as offering analyzed information and giving an alarm based on the status information 534, the driver information 536, and/or the accident information 538 stored in the server 540. The service company 560 may share vehicle-related information stored in the server 540 with a contractor 522.

Figure 17:
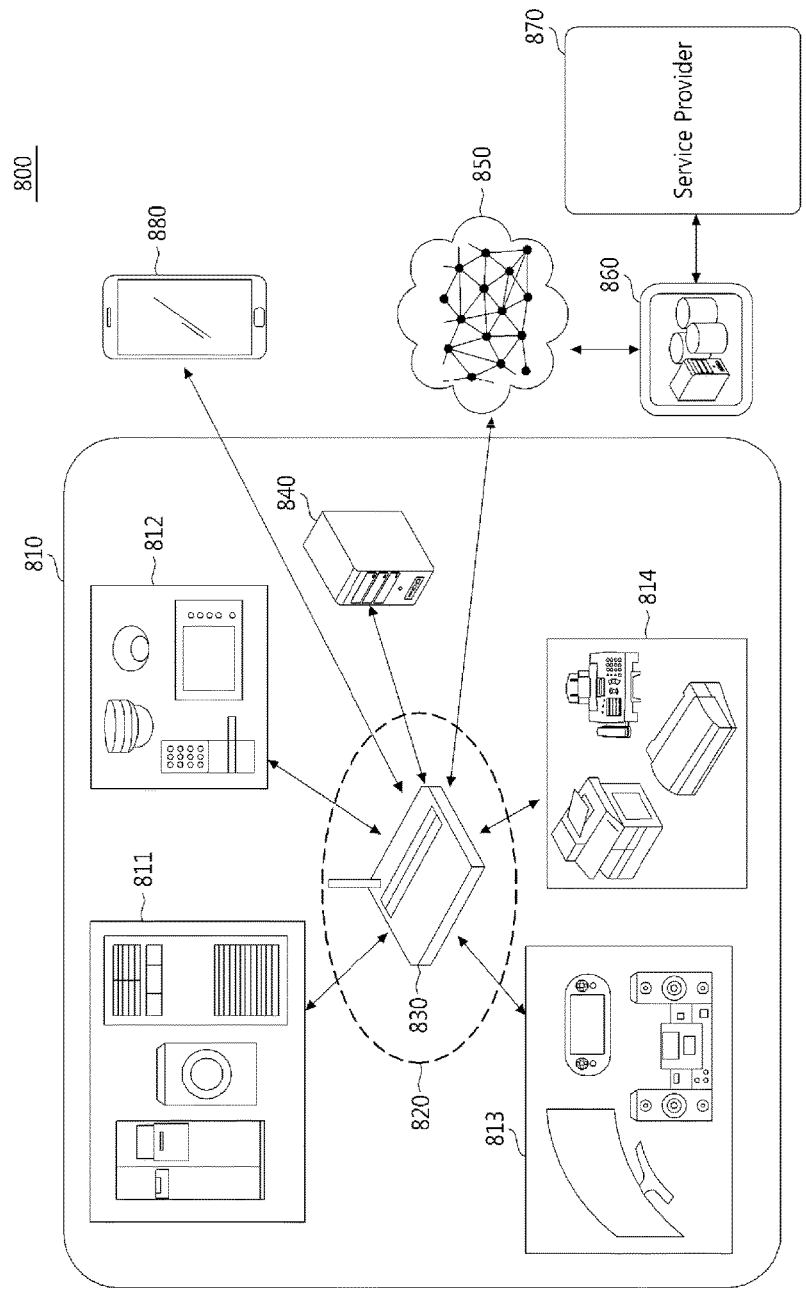
FIG. 17 is a conceptual diagram of an IoT service system based on a home network according to one or more exemplary embodiments.

FIG. 17 is a conceptual diagram of an IoT service system 800 based on a home network according to one or more exemplary embodiments. Referring to FIG. 17, the IoT service system 800 includes a home network system 810 including a plurality of IoT devices 811 through 814. The IoT service system 800 may also include a communication network 850, a server 860, and a service provider 870.

The home network system 810 is technology for controlling various devices in a building (e.g., a house or an apartment) through a wired and/or wireless network and allowing the devices to share contents. The home network system 810 may include a plurality of the IoT devices 811 through 814, a home network 820, and a home gateway 830. The home network system 810 may also include a home server 840.

The IoT devices 811 through 814 may include home appliances 811 such as a refrigerator, a washing machine, an air conditioner, a stove, an oven, a dishwasher, etc; security/safety equipment 812 such as a door lock, CCTV, a camera, interphone, a window sensor, a fire detection sensor, and an electric plug; entertainment equipment 813 such as a TV, an audio device, an audio/video device, a video device, a display device, a game machine, and a computer; and office equipment 814 such as a printer, a projector, a copy machine, a fax machine, a scanner, a multi-purpose device, etc. Apart from these examples, the IoT devices 811 through 814 include various kinds of electronic devices or sensing devices. Each of the IoT devices 811 through 814 may include at least one sensor. The sensors included in the IoT devices 811 through 814 may correspond to the sensors 111-1 through 111-k.

The IoT devices 811 through 814 may communicate with one another through the home network 820 or may communicate with the home gateway 830. The IoT devices 811 through 814 and the home gateway 830 may communicate sensor data or control information with each other.

The home gateway 830 may include the data processing device 100 according to one or more exemplary embodiments. The data processing device 100 of the home gateway 830 may perform correction/rectification and size/resolution conversion on sensor data collected from the IoT devices 811 through 814 and may generate information by post-processing and combining corrected/rectified/converted data.

The home network 820 may include various types of wired/wireless communication networks.

The IoT devices 811 through 814 may be connected to the external communication network 850 through the home gateway 830. The home gateway 830 may convert protocols between the home network 820 and the external communication network 850 to connect the networks 820 and 850. The home gateway 830 may also convert protocols among communication networks included in the home network 820 to connect the IoT devices 811 through 814 and the home server 840. The home gateway 830 may be provided separately from other components or may be included in other components. For example, the home gateway 830 may be included in the IoT devices 811 through 814 or the home server 840.

The home server 840 may be provided within a house (or an apartment block) and may store or analyze data received. The home server 840 may offer relevant service based on analyzed information and/or may provide the analyzed information for the service provider 870 or a user device 880 through the external communication network 850. The home server 840 may also store external contents received through the home gateway 830, may process data, and may provide processed data for the IoT devices 811 through 814.

For example, the home server 840 may store input/output data provided from the security/safety equipment 812 and/or may provide automatic security service and power management service for the IoT devices 811 through 814 based on the input/output data. In addition, the home server 840 may analyze data received from the IoT devices 811 through 814 including an illuminance sensor, a humidity sensor, a pollution detection sensor, etc., generate environment information, and provide home environment control service based on the environment information or provide the environment information for the user device 880.

The home server 840 may include the data processing device 100 according to one or more exemplary embodiments. The data processing device 100 of the home server 840 may perform correction/rectification and size/resolution conversion on sensor data collected from the IoT devices 811 through 814 and may generate information by post-processing and combining corrected/rectified/converted data.

The external communication network 850 may include an internet and/or a public communication network. The public communication network may include a mobile cellular network. The external communication network 850 may be a channel through which information collected by the IoT devices 811 through 814 in the home network system 810 is transmitted.

The server 860 may store or analyze collected information to generate relevant service information or may provide the stored information and/or the analyzed information for the service provider 870 and/or the user device 880.

The service provider 870 may analyze collected information and provide various services for users. The service provider 870 may be a company providing service or public facilities.

The service provider 870 may provide services, such as remote meter reading, crime/disaster prevention, home care, health care, entertainment, education, public administration, etc., for the IoT devices 811 through 814 through the home network system 810 or for the user device 880. In addition, the service provider 870 may directly provide the services for a user.

Figure 18:
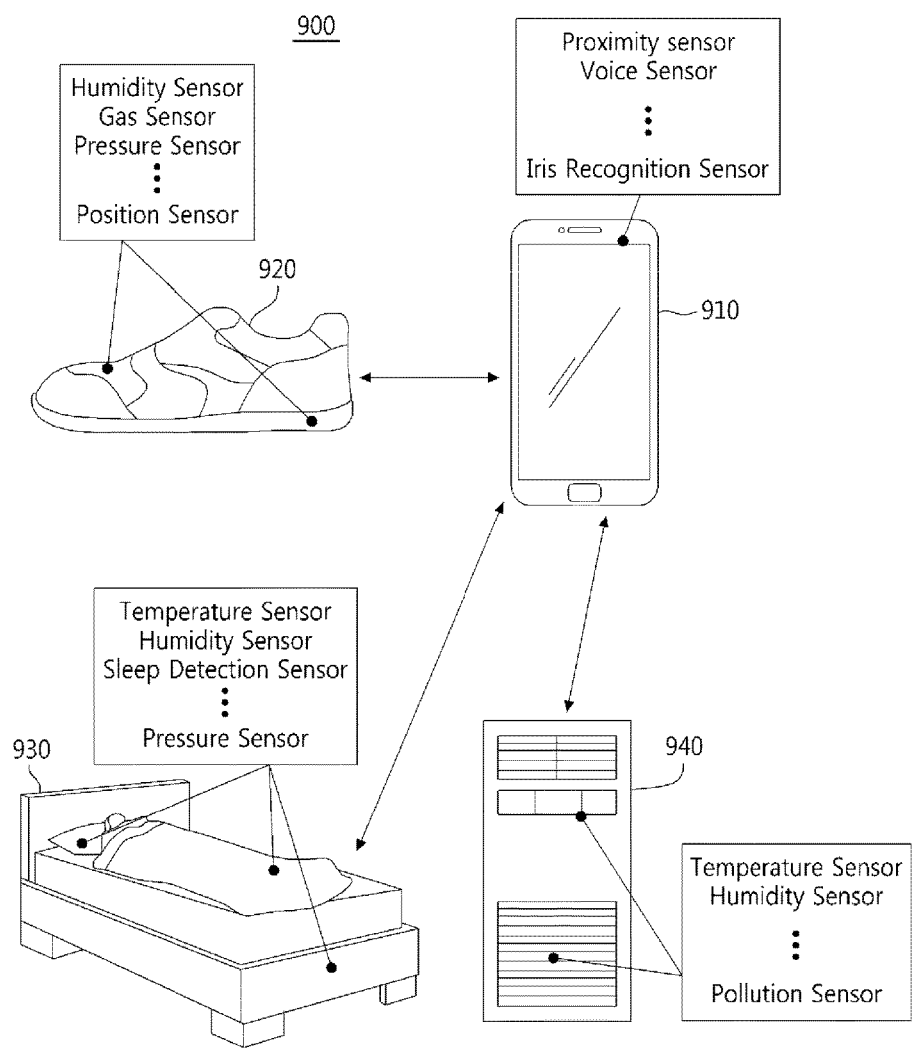
FIG. 18 is a schematic diagram for explaining a network among things according to one or more exemplary embodiments.

FIG. 18 is a schematic diagram for explaining a network among things according to one or more exemplary embodiments. Referring to FIG. 18, a network system 900 may include various IoT devices 910, 920, 930, and 940 and may use various wired/wireless communication techniques. In detail, the network system 900 may use IoT technology including a sensor network, M2M communication, and D2D communication.

The IoT devices 910, 920, 930, and 940 may include electronic devices such as a smart phone 910 and an air conditioner 940 and non-electronic things, such as a shoe 920 and a bed/bedding 930, equipped with a sensor. The IoT devices 910, 920, 930, and 940 may communicate data with one another.

Each of the IoT devices 910, 920, 930, and 940 may include at least one sensor and may detect information occurring inside/outside. A sensor installed in each of the IoT devices 910, 920, 930, and 940 may be implemented as a smart sensor including a sensor element and a communication circuit or a processor as well. Sensors of the IoT devices 910, 920, 930, and 940 may correspond to the sensors 111-1 through 111-k.

At least one of the IoT devices 910, 920, 930, and 940 may operate as a master device controlling the IoT devices 910, 920, 930, and 940. The smart phone 910 may be the master device in one or more exemplary embodiments, but it is understood that one or more other exemplary embodiments are not limited thereto. For example, according to another exemplary embodiment, the master device may be a mobile device such as a tablet PC, a PDA, a notebook computer, or a netbook, a wearable device, or a smart home appliance like smart TV. Hereinafter, it is assumed that the smart phone 910 is the master device.

The smart phone 910 may generate a control signal or a notification signal based on sensor data sensed by various sensors installed therein and/or sensor data received from the IoT devices 920, 930, and 940. For this operation, the smart phone 910 may include the data processing device 100A, 100A', 100B, 100B', or 200 according to one or more exemplary embodiments.

The control signal may control the operation of the IoT devices 920, 930, and 940 and/or the operation of the smart phone 910. The notification signal may indicate the state of the IoT devices 920, 930, and 940 or a user state.

For example, the smart phone 910 may receive sensed information, such as temperature, humidity, user's respiration, and user's heart beat from the bed/bedding 930 and may determine the user's sleep state and the state of an ambient environment based on the sensed information. The smart phone 910 may generate a control signal for controlling the operation of the air conditioner 940 based on the determination result and send the control signal to the air conditioner 940.

In another example, the smart phone 910 may generate a notification signal indicating a pollution level of the shoe 920 or a notification signal indicating the amount of activity or consumed calories based on sensed information such as humidity, odor, pressure, and position provided from the shoe 920.

According to an exemplary embodiment, a general-purpose data processing device may be provided to correspond to various types and numbers of sensors, and memory accessing may be minimized when data is input to or output from the sensors, thereby decreasing a system memory bandwidth and power consumption.

According to an exemplary embodiment, an image may be enhanced or additional information may be generated by correcting homogeneous or heterogeneous multiple sensor data by a random number of preprocessors and combining results of correcting the homogeneous or heterogeneous multiple sensor data.

It is understood that the data processing device 100A, 100A', 100B, 100B', or 200 may be implemented in or as any type of processing device, including by way of example a smart device, a television, a mobile device, a computing device, an IoT device, a television, a smart television, a wearable device, a smart wearable device, a tablet device, a personal digital assistant (PDA), a portable multimedia player (PMP), an audio/video device, a set-top box, a digital camera, an image capturing device, etc.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more of the above-described elements can include circuitry, a processor, a microprocessor, etc., and may execute a computer program stored in a computer-readable medium.

While exemplary embodiments have been particularly shown and described above, it will be understood that various changes in form and details may be made therein without departing from the spirit and scope of the following claims.

What is claimed is:

1. A data processing device comprising:
a plurality of preprocessors configured to perform correction processing on a plurality of sensor data having different resolutions;
a first switching circuit configured to selectively map and input the plurality of sensor data from at least two sensors of different resolutions to at least two preprocessors among the plurality of preprocessors;
a hybrid data processing engine configured to perform at least one of image enhancement and depth information determination on the plurality of sensor data received, via an on-the-fly method, from the at least two preprocessors; and
a plurality of converters configured to convert the resolutions and pixel formats of the plurality of sensor data received from the at least two preprocessors so that the resolutions of the plurality of sensor data are equal to one another,
wherein the first switching circuit is configured to selectively, based on types of the plurality of sensor data, map and input the plurality of sensor data from the at least two sensors to the at least two preprocessors.

2. The data processing device according to claim 1, further comprising:
a second switching circuit configured to selectively map and input the plurality of sensor data from the at least two preprocessors to the plurality of converters, according to a mode of operation of the data processing device.

3. The data processing device according to claim 2, wherein the second switching circuit is configured to selectively bypass the plurality of converters and directly input the plurality of sensor data from the at least two preprocessors to the hybrid data processing engine, according to the mode of operation.

4. The data processing device according to claim 1, wherein the hybrid data processing engine comprises a plurality of hardware elements configured to perform the at least one of the image enhancement and the depth information determination, and
connections between the plurality of hardware elements and operations of the plurality of hardware elements are selectively configured according to a mode of operation of the data processing device.

5. The data processing device according to claim 4, further comprising a register configured to selectively control the connections between the plurality of hardware elements and the operations of the plurality of hardware elements according to the mode of operation.

6. The data processing device according to claim 4, wherein the plurality of hardware elements comprises a plurality of processing elements or a plurality of logic gates.

7. A method of processing a plurality of sensor data by a data processing device, the method comprising:
selectively mapping and inputting, by a switching circuit, the plurality of sensor data from at least two sensors of different resolutions to at least two preprocessors among a plurality of preprocessors of the data processing device;
performing, by the at least two preprocessors, correction processing on the plurality of sensor data;
performing, by a hybrid data processing engine, at least one of image enhancement and depth information determination on the plurality of correction-processed sensor data received from the at least two preprocessors; and
converting, by a plurality of converters, resolutions and pixel formats of the plurality of sensor data so that the resolutions of the plurality of sensor data are equal to one another,
wherein the selectively mapping comprises selectively, based on types of the plurality of sensor data, mapping and inputting the plurality of sensor data from the at least two sensors to the at least two preprocessors.

8. The method according to claim 7, wherein the performing the at least one the image enhancement and the depth information determination comprises obtaining the plurality of correction-processed sensor data from an external memory and performing the at least one of the image enhancement and the depth information determination on the obtained plurality of correction-processed sensor data.

9. The method according to claim 7, wherein the performing the at least one the image enhancement and the depth information determination comprises performing the at least one of the image enhancement and the depth information determination on the plurality of sensor data received, via an on-the-fly method, from the at least two preprocessors.

10. A data processing system comprising:
a plurality of sensors configured to obtain a plurality of sensor data having different resolutions; and
a data processing device comprising:
  a plurality of preprocessors configured to perform correction processing on the plurality of sensor data;
  a first switching circuit configured to selectively map and input the plurality of sensor data from at least two sensors, among the plurality of sensors, to at least two preprocessors, among the plurality of preprocessors;
  a hybrid data processing engine configured to perform at least one of image enhancement and depth information determination on the plurality of sensor data received from the at least two preprocessors; and
  a plurality of converters configured to convert the resolutions and pixel formats of the plurality of sensor data received from the at least two preprocessors so that the resolutions of the plurality of sensor data are equal to one another,
wherein the first switching circuit is configured to selectively, based on types of the plurality of sensor data, map and input the plurality of sensor data from the at least two sensors to the at least two preprocessors.

11. The data processing device according to claim 10, wherein the hybrid data processing engine is configured to receive the plurality of sensor data from the at least two preprocessors via a memory access.

12. The data processing device according to claim 10, wherein the hybrid data processing engine is configured to receive the plurality of sensor data from the at least two preprocessors without use of a memory.

13. The data processing system according to claim 10, wherein the at least two sensors are different types of sensors.

14. The data processing system according to claim 10, further comprising a central processing unit configured to control the selective mapping and inputting of the first switching circuit.

15. The data processing device according to claim 1, wherein a first converter, among the plurality of converters, is configured to convert at least one of a resolution and a pixel format of first sensor data, among the received plurality of sensor data, based on at least one of a resolution and a pixel format of second sensor data, among the received plurality of sensor data.

* * * * *